(12) United States Patent
You et al.

(10) Patent No.: US 9,930,646 B2
(45) Date of Patent: Mar. 27, 2018

(54) METHOD AND USER DEVICE FOR RECEIVING UPLINK CONTROL INFORMATION, AND METHOD AND BASE STATION FOR TRANSMITTING UPLINK INFORMATION

(71) Applicant: LG Electronics Inc., Seoul (KR)

(72) Inventors: Hyangsun You, Anyang-si (KR); Yunjung Yi, Anyang-si (KR); Bonghoe Kim, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 14/427,191

(22) PCT Filed: Oct. 10, 2013

(86) PCT No.: PCT/KR2013/009048
§ 371 (c)(1),
(2) Date: Mar. 10, 2015

(87) PCT Pub. No.: WO2014/058236
PCT Pub. Date: Apr. 17, 2014

(65) Prior Publication Data
US 2015/0249980 A1  Sep. 3, 2015

Related U.S. Application Data

(60) Provisional application No. 61/712,229, filed on Oct. 10, 2012, provisional application No. 61/810,226, filed on Apr. 9, 2013.

(51) Int. Cl.
*H04W 4/00* (2009.01)
*H04W 72/04* (2009.01)
(Continued)

(52) U.S. Cl.
CPC ....... *H04W 72/0413* (2013.01); *H04L 1/1861* (2013.01); *H04L 5/001* (2013.01); *H04L 5/0055* (2013.01)

(58) Field of Classification Search
CPC ..... H04L 1/1861; H04L 5/001; H04L 5/0055; H04W 72/0413
See application file for complete search history.

(56) References Cited

U.S. PATENT DOCUMENTS

2011/0243066 A1* 10/2011 Nayeb Nazar .......... H04L 1/007
370/328
2011/0274043 A1  11/2011 Nam et al.
(Continued)

FOREIGN PATENT DOCUMENTS

EP          2418901       2/2012
KR    1020110084964       7/2011
WO       2011085230       7/2011

*Primary Examiner* — Ayaz Sheikh
*Assistant Examiner* — Hai-Chang Hsiung
(74) *Attorney, Agent, or Firm* — Dentons US LLP

(57) ABSTRACT

The present invention determines a PUCCH resource based on which serving cell ACK/NACK information is related to, when a user device set as a plurality of serving cells transmits the ACK/NACK information. Moreover, if a PUCCH transmission time matches with a PUSCH transmission time, the present invention does not piggy back ACK/NACK information to PUSCH but transmits the ACK/NACK information through PUCCH.

16 Claims, 14 Drawing Sheets

(51) Int. Cl.
*H04L 1/18* (2006.01)
*H04L 5/00* (2006.01)

(56) References Cited

U.S. PATENT DOCUMENTS

| | | |
|---|---|---|
| 2012/0184314 A1 | 7/2012 | Malladi et al. |
| 2012/0307689 A1* | 12/2012 | Kim ................... H04L 1/1861 370/280 |
| 2013/0188619 A1* | 7/2013 | Dinan ............... H04W 56/0005 370/336 |
| 2014/0029584 A1* | 1/2014 | Qu ..................... H04W 72/042 370/336 |

* cited by examiner

METHOD AND USER DEVICE FOR RECEIVING UPLINK CONTROL INFORMATION, AND METHOD AND BASE STATION FOR TRANSMITTING UPLINK INFORMATION

This application is a 35 USC § 371 National Stage entry of International Application No. PCT/KR2013/009048 filed on Oct. 10, 2013, and claims priority to U.S. Provisional Application Nos. 61/712,229 filed on Oct. 10, 2012 and 61/810,226 filed on Apr. 9, 2013, all of which are hereby incorporated by reference in their entireties as if fully set forth herein.

TECHNICAL FIELD

The present invention relates to a wireless communication system and, more particularly, to a method for receiving or transmitting uplink control information and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of uplink control information that each UE should provide increases. Since the amount of resources available to the BS for communication with the UE(s) is limited, a new method in which the BS efficiently receives uplink control information using the limited radio resources is needed.

Therefore, the present invention provides a method and apparatus for efficiently transmitting/receiving UL control information.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for transmitting uplink control information by a user equipment, including configuring a plurality of serving cells including a primary cell (PCell) and one or more secondary cells (SCells), based on serving cell configuration information for configuring the one or more SCells; and transmitting acknowledgement (ACK)/negative acknowledgement (NACK) information for at least one of the plural serving cells using a specific serving cell among the plural serving cells in an uplink subframe. The serving cell configuration information may include group information indicating to which group of a first group with the PCell and a second group without the PCell each of the one or more SCells belongs. If physical uplink shared channel (PUSCH) transmission is configured on the first group when the ACK/NACK information corresponds to second ACK/NACK information for the second group rather than first ACK/NACK information for the first group, the PUSCH transmission may be dropped and the ACK/NACK information may be transmitted on a physical uplink control channel (PUCCH) of the specific serving cell.

In another aspect of the present invention, provided herein is a user equipment including a radio frequency (RF) unit and a processor configured to control the RF unit. The processor may configure a plurality of serving cells including a primary cell (PCell) and one or more secondary cells (SCells), based on serving cell configuration information for configuring the one or more SCells. The processor may control the RF unit to transmit acknowledgement (ACK)/negative acknowledgement (NACK) information for at least one of the plural serving cells using a specific serving cell among the plural serving cells in an uplink subframe. The serving cell configuration information may include group information indicating to which group of a first group with the PCell and a second group without the PCell each of the one or more SCells belongs. If physical uplink shared channel (PUSCH) transmission is configured on the first group when the ACK/NACK information corresponds to second ACK/NACK information for the second group rather than first ACK/NACK information for the first group, the PUSCH transmission may be dropped and the ACK/NACK information may be transmitted on a physical uplink control channel (PUCCH) of the specific serving cell.

In still another aspect of the present invention, provided herein is a method for receiving uplink control information by a base station, including transmitting serving cell configuration information for configuring one or more secondary cells (SCells); and receiving acknowledgement (ACK)/negative acknowledgement (NACK) information for at least one of a plurality of serving cells using a specific serving cell among the plural serving cells in an uplink subframe from a user equipment in which the plural serving cells including a primary cell (PCell) and one or more SCells are configured based on the serving cell configuration information. The serving cell configuration information may include group information indicating to which group of a first group with the PCell and a second group without the PCell each of the one or more SCells belongs. If physical uplink shared channel (PUSCH) reception is configured on the first group when the ACK/NACK information corresponds to second ACK/NACK information for the second group rather than first ACK/NACK information for the first group, the PUSCH reception may be dropped and the ACK/NACK information may be received on a physical uplink control channel (PUCCH) of the specific serving cell.

In a further aspect of the present invention, provided herein is a base station for receiving uplink control information, including a radio frequency (RF) unit and a processor configured to control the RF unit. The processor may control the RF unit to transmit serving cell configuration information for configuring one or more secondary cells (SCells) and control the RF unit to receive acknowledgement (ACK)/negative acknowledgement (NACK) information for at least one of a plurality of serving cells using a specific serving cell among the plural serving cells in an uplink subframe from a user equipment in which the plural serving cells including a primary cell (PCell) and one or more SCells are configured based on the serving cell configuration information. The serving cell configuration information may include group information indicating to which group of a first group with the PCell and a second group without the PCell each of the one or more SCells belongs. If physical uplink shared channel (PUSCH) reception is configured on the first group when the ACK/NACK information corresponds to second ACK/NACK information for the second group rather than first ACK/NACK information for the first group, the PUSCH reception may be dropped and the ACK/NACK information may be received on a physical uplink control channel (PUCCH) of the specific serving cell.

In each aspect of the present invention, the specific serving cell may be the PCell or a specific SCell of the second group.

In each aspect of the present invention, the specific serving cell may be the PCell when the ACK/NACK information corresponds to the first ACK/NACK information rather than the second ACK/NACK information.

In each aspect of the present invention, the serving cell configuration information may further include information indicating whether the SCell is the specific SCell.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, UL control information can be efficiently transmitted/received. Thus, overall throughput of a wireless communication system is improved.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
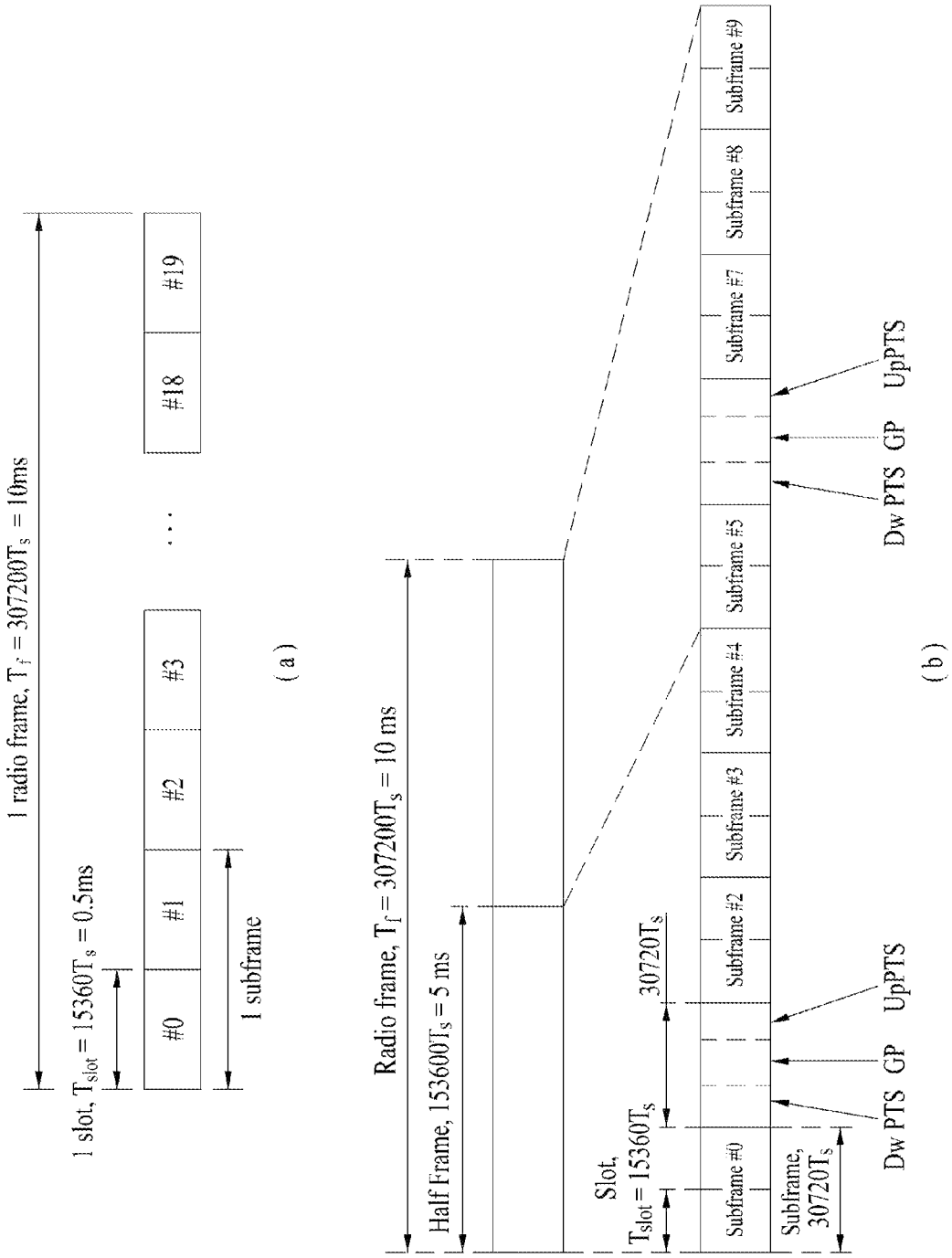
FIGS. 1(a) and 1(b) illustrate the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described in detail when carrier aggregation is described.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIGS. 1(a) and 1(b) illustrate the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIGS. 1(a) and 1(b), a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  |              |              |
| 5 | 6592 · $T_s$  | 4384 · $T_s$ | 5120 · $T_s$ | 20480 · $T_s$ | 4384 · $T_s$ | 5120 · $T_s$ |
| 6 | 19760 · $T_s$ |              |              | 23040 · $T_s$ |              |              |
| 7 | 21952 · $T_s$ |              |              | —             | —            | —            |
| 8 | 24144 · $T_s$ |              |              | —             | —            | —            |

Figure 2:
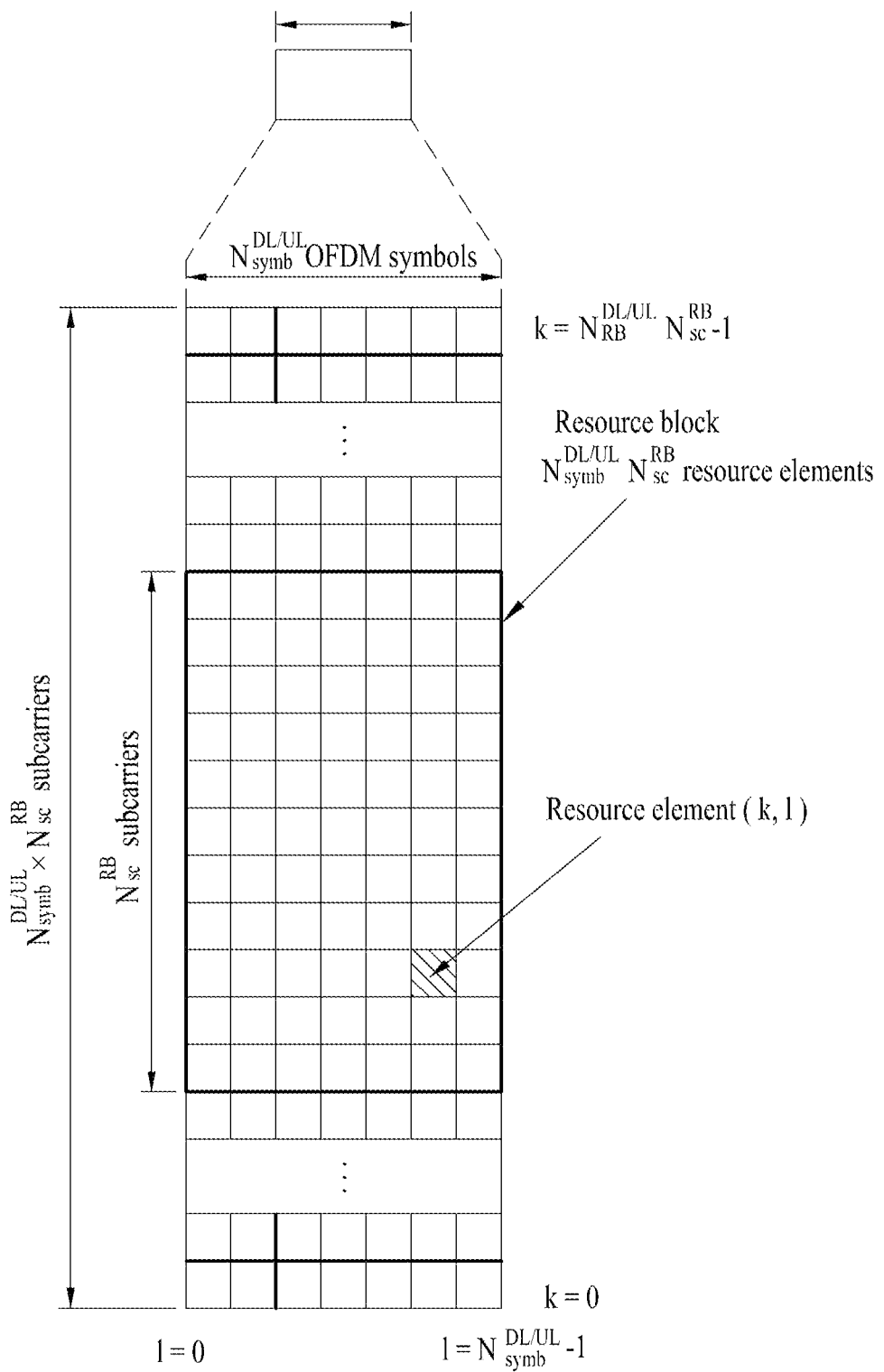
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb}*N^{RB}_{sc}$ REs. Each RE within a resource grid may be uniquely defined by an index pair (k, 1) within one slot. k is an index ranging from 0 to $N^{DL/UL}_{RB}*N^{RB}_{sc}-1$ in the frequency domain, and 1 is an index ranging from 0 to $N^{DL/UL}_{symb}1-1$ in the time domain.

Meanwhile, one RB is mapped to one physical resource block (PRB) and one virtual resource block (VRB). A PRB is defined as NDLsymb (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
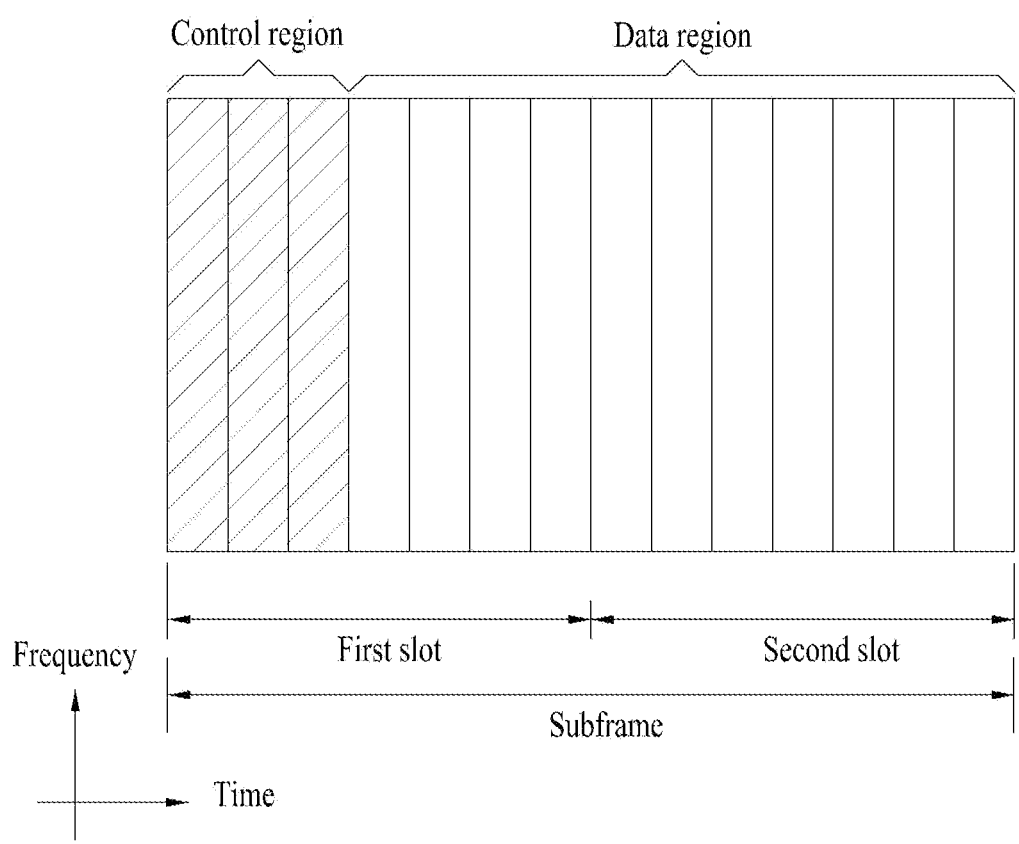
FIG. 3 illustrates the structure of a DL subframe used in a wireless communication system.

FIG. 3 illustrates the structure of a DL subframe used in a wireless communication system.

A DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. Table 3 illustrates an example of the DCI format.

TABLE 3

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MEMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

In Table 3, formats 0 and 4 are DCI formats defined for UL and formats 1, 1A, 1B, 1C, 1D, 2, 2A, 2B, 2C, 3, and 3A are DCI formats defined for DL. Various DCI formats in addition to the formats shown in Table 3 may be defined.

A plurality of PDCCHs may be transmitted in a control region. The UE may monitor the PDCCHs. The eNB determines a DCI format according to DCI to be transmitted to the UE and attaches a cyclic redundancy check (CRC) to the DCI. The CRC is masked (or scrambled) with an identifier (e.g. a radio network temporary identifier (RNTI)) according to an owner or a usage of a PDCCH. For example, if the PDCCH is dedicated to a specific UE, an identifier (e.g. a cell-RNTI (C-RNTI)) of the UE may be masked to the CRC. If the PDCCH is used for a paging message, a paging identifier (e.g. a paging-RNTI (P-RNTI)) may be masked to the CRC. If the PDCCH is used for system information (more specifically, a system information block (SIB)), a system information RNTI (SI-RNTI) may be masked to the CRC. If the PDCCH is used for a random access response, a random access-RNTI (RA-RNTI) may be masked to the CRC. CRC masking (or scrambling) includes, for example, XOR operation between the CRC and the RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG.

A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). For example, the PCFICH and PHICH include 4 REGs and 3 REGs, respectively. Assuming that the number of REGs not allocated to the PCFICH or the PHICH is $N_{REG}$, the number of available CCEs in a DL subframe for PDCCH(s) in a system is numbered from 0 to $N_{CCE}-1$ where $N_{CCE}=\text{floor}(N_{REG}/9)$.

A PDCCH format and the number of DCI bits are determined according to the number of CCEs. The following table shows supported PDCCH formats, the number of CCEs per format, and the number of supported DCI bits.

TABLE 4

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered and are consecutively used. To simplify a decoding process, a PDCCH having a format comprised of n CCEs may be started only on a CCE having a number corresponding to a multiple of n. For example, a PDCCH comprised of n consecutive CCEs may be started only on a CCE satisfying 'i mod n=0' where i is a CCE index (or CCE number).

The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

If technology for M2M communication, multi-node systems, later-described cross-CC scheduling, etc. is introduced, the amount of PDCCHs that the eNB should transmit increases. However, since the size of a control region in which the PDCCHs can be transmitted is the same as that of the conventional art, PDCCH transmission acts as a bottleneck in system performance. Although channel quality can be improved by introduction of a multi-node system and application of various communication schemes, introduction of a new control channel has been demanded in order to apply an existing communication scheme and carrier aggregation technology to a multi-node environment. Due to this necessity, configuring the new control channel in a data region (hereinafter, a PDSCH region) rather than an existing control region (hereinafter, a PDCCH region) has been discussed. Hereinafter, the new control channel will be referred to as an enhanced PDCCH or an evolved PDCCH (EPDCCH). Using the EPDCCH enables transmission of control information per node to the UE and also can solve shortage of the existing PDCCH region. For reference, unlike a PDCCH which is configured on front OFDM symbol(s) of a predetermined number designated by a PCFICH in a DL subframe, the EPDCCH is configured on OFDM symbols after an OFDM symbol designated by a higher layer signal. In addition, in the case of the PDCCH, available REs on one OFDM symbol among the front OFDM symbol(s) are allocated first to the PDCCH and then REs on the next OFDM symbol are allocated to the PDCCH. In contrast, in the case of the EPDCCH, PRB pairs of a predetermined number are allocated to the EPDCCH. That is, time resources of the PDCCH occupy only the front OFDM symbol(s) of a predetermined number and frequency resources of the PDCCH are distributed in the frequency domain, whereas time resources of the EPDCCH occupy a plurality of OFDM symbols after OFDM symbols of a predetermined number and frequency resources of the EPDCCH are present only in PRB pairs of a predetermined number. The PDCCH is transmitted through the same antenna port(s) as antenna port(s) configured for transmission of a CRS and the UE configured to decode the PDCCH may demodulate or decode the PDCCH using the CRS. In contrast, the EPDCCH is a channel which is introduced in consideration of a new communication technique or a new communication environment. The EPDCCH is transmitted together with a DMRS transmitted on predetermined resources on which the EPDCCH is configured and the UE configured to decode the EPDCCH demodulates the EPDCCH using the DMRS. Hereinafter, the PDCCH and the EPDCCH are collectively referred to as the PDCCH. For reference, since demodulation may be understood as a part of a decoding process, the term decoding may be used instead of the term demodulation in the present invention.

Figure 4:
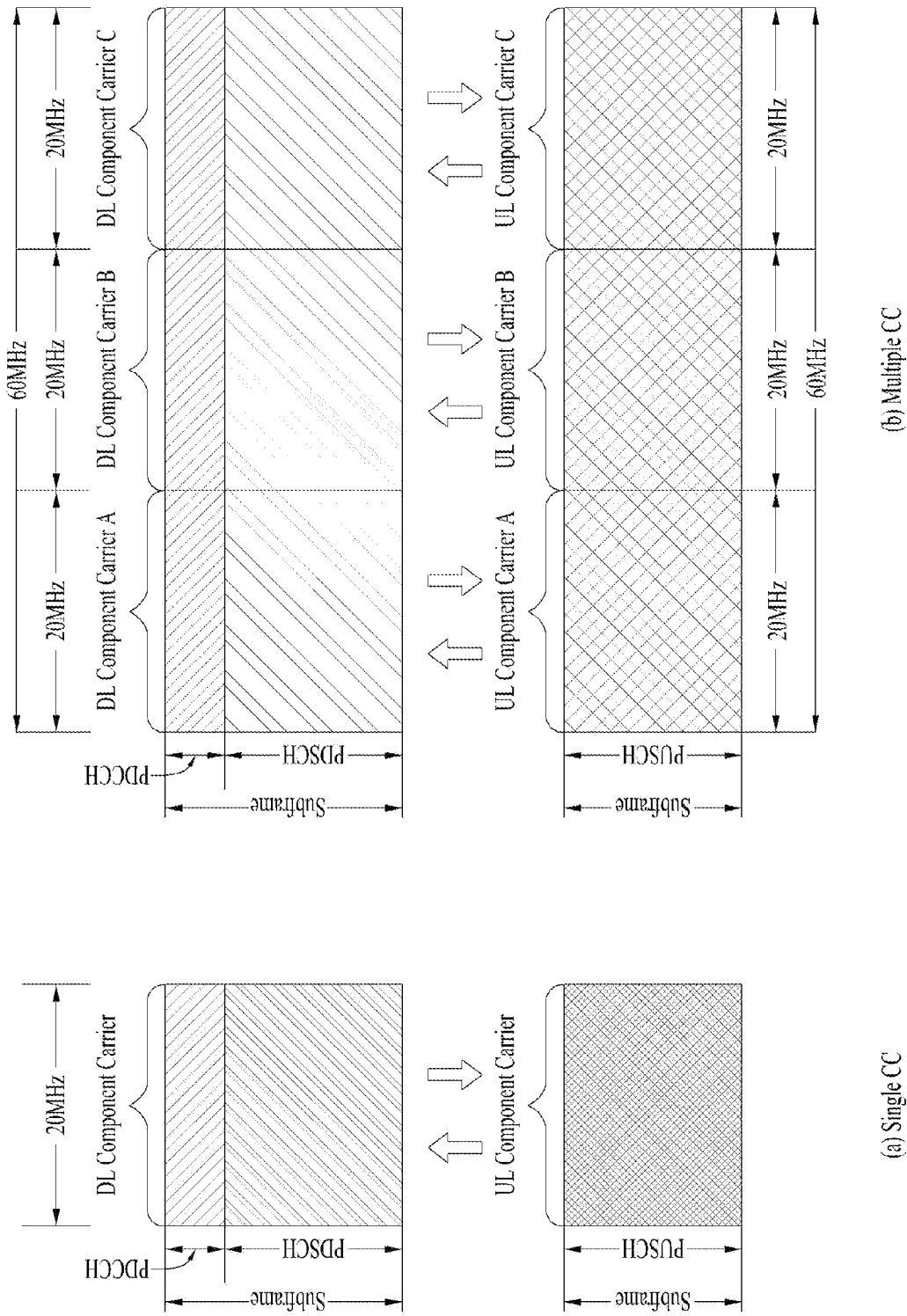
FIGS. 4(a) and 4(b) are diagrams for explaining single-carrier communication and multi-carrier communication.

FIGS. 4(a) and 4(b) are diagrams for explaining single-carrier communication and multi-carrier communication. Specially, FIG. 4(a) illustrates a subframe structure of a single carrier and FIG. 4(b) illustrates a subframe structure of multiple carriers.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal sub-carriers on a single carrier frequency to perform DL or UL communication. Hereinbelow, each of carriers aggregated by CA will be referred to as a component carrier (CC). For example, three 20 MHz CCs in each of UL and DL are aggregated to support a BW of 60 MHz. The CCs may be contiguous or non-contiguous in the frequency domain. Although a BW of UL CC and a BW of DL CC are the same and are symmetrical, a BW of each component carrier may be defined independently. In addition, asymmetric CA where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If CA is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on downlink will be referred to as a downlink primary CC (DL PCC), and the carrier corresponding to the PCell on uplink will be referred to as an uplink primary CC (UL PCC). A SCell means a cell that may be configured after completion of radio resource control (RRC) connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC). Although the UE is in RRC-CONNECTED state, if it is not configured by CA or does not support CA, a single serving cell configured by the PCell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as PCell, and a cell which may be activated/deactivated freely by the eNB will be referred to as SCell. The PCell and the SCell may be identified from each other on the basis of the control information. For example, specific control information may be set to be transmitted and received through a specific cell only. This specific cell may be referred to as the PCell, and the other cell(s) may be referred to as SCell(s).

Figure 5:
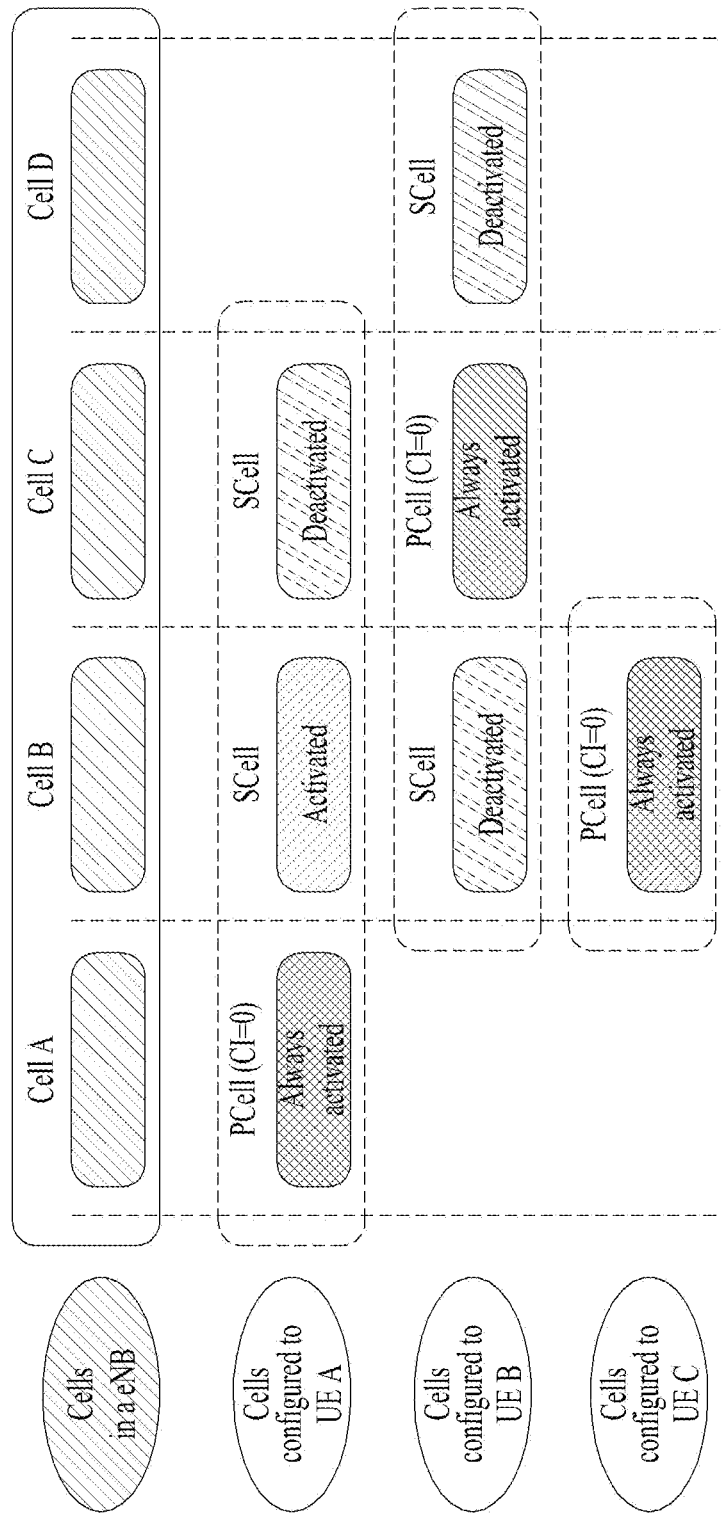
FIG. 5 illustrates the state of cells in a system supporting carrier aggregation.

FIG. 5 illustrates the state of cells in a system supporting CA.

In FIG. 5, the configured cell for the UE may be a serving cell in terms of the UEIn FIG. 5, a configured cell refers to a cell in which CA is performed for a UE based on measurement reporting from other eNBs or UEs among cells of an eNB and is configured per UE. A cell configured for the UE may be a serving cell in terms of the UE. The configured cell for the UE, i.e. the serving cell, prereserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. In order to distinguish between serving cell(s), serving cell indexes (ServCellIndex) may be used. For example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies. '0' among the serving cell indexes is applied to the PCell. Integers from 1 to 'maximum number of carrier frequencies which can be configured for the UE at a time minus 1' are used for the SCell. An SCell index (SCellIndex) used to identify the SCell may be one of integers from 1 to 7.

As described above, the term cell used in CA is distinguished from the term cell referring to a prescribed geographic region to which a communication service is provided by one eNB or one antenna group. To distinguish between a cell indicating a prescribed geographic region and a cell of CA, in the present invention, the cell of CA is referred to as a CC and the cell of a geographic region is referred to as a cell.

In a CA situation, a plurality of serving CCs may be configured for one UE. A scheme performed by a control channel for scheduling a data channel can be divided into existing linked carrier scheduling and cross carrier scheduling. In link carrier scheduling, a control channel transmitted on a specific CC schedules only a data channel which is to be transmitted or received on the specific CC. In contrast, in cross carrier scheduling, a serving CC having a good channel state may be used to transmit a UL/DL grant for another serving CC. In cross carrier scheduling, a CC on which a UL/DL grant which is scheduling information is transmitted may be different from a CC on which UL/DL transmission corresponding to the UL/DL grant is performed. In cross carrier scheduling, a control channel schedules, using a carrier indicator field (CIF) in DCI, a data channel transmitted on a CC different from a CC on which a PDCCH carrying the DCI is configured. When cross carrier scheduling (also referred to as cross-CC scheduling) is applied, a PDCCH for DL assignment may be transmitted on, for example, DL CC#0 and a PDSCH corresponding to the PDCCH may be transmitted on, for example, DL CC#2. Whether a CIF is present in the PDCCH may be configured semi-statically and UE-specifically (or UE group-specifically) by higher layer signaling (e.g. RRC signaling). The baseline of PDCCH transmission is summarized as below.

CIF disabled: A PDCCH on a DL CC assigns PDSCH resources on the same DL CC or PUSCH resources on a single linked UL CC.

CIF enabled: A PDCCH on a DL CC can assign PDSCH or PUSCH resources on a specific DL/UL CC among multiple aggregated DL/UL CCs using the CIF.

In the case of presence of the CIF, the eNB may assign a PDCCH monitoring DL CC set for reduction of BD complexity of the UE. The PDCCH monitoring DL CC set is a portion of the entire aggregated DL CCs and includes one or more DL CCs. The UE performs detection/decoding of PDCCHs on corresponding DL CCs. In other words, upon scheduling a PDSCH/PUSCH for the UE, the eNB transmits the PDCCH only through the PDCCH monitoring DL CC set. The PDCCH monitoring DL CC set may be configured UE-specifically, UE-group-specifically, or cell-specifically. The term "PDCCH monitoring DL CC" may be replaced with an equivalent term such as monitoring carrier, monitoring cell, etc. In addition, a CC aggregated for the UE may be replaced with an equivalent term such as serving CC, serving carrier, serving cell, etc.

Figure 6:
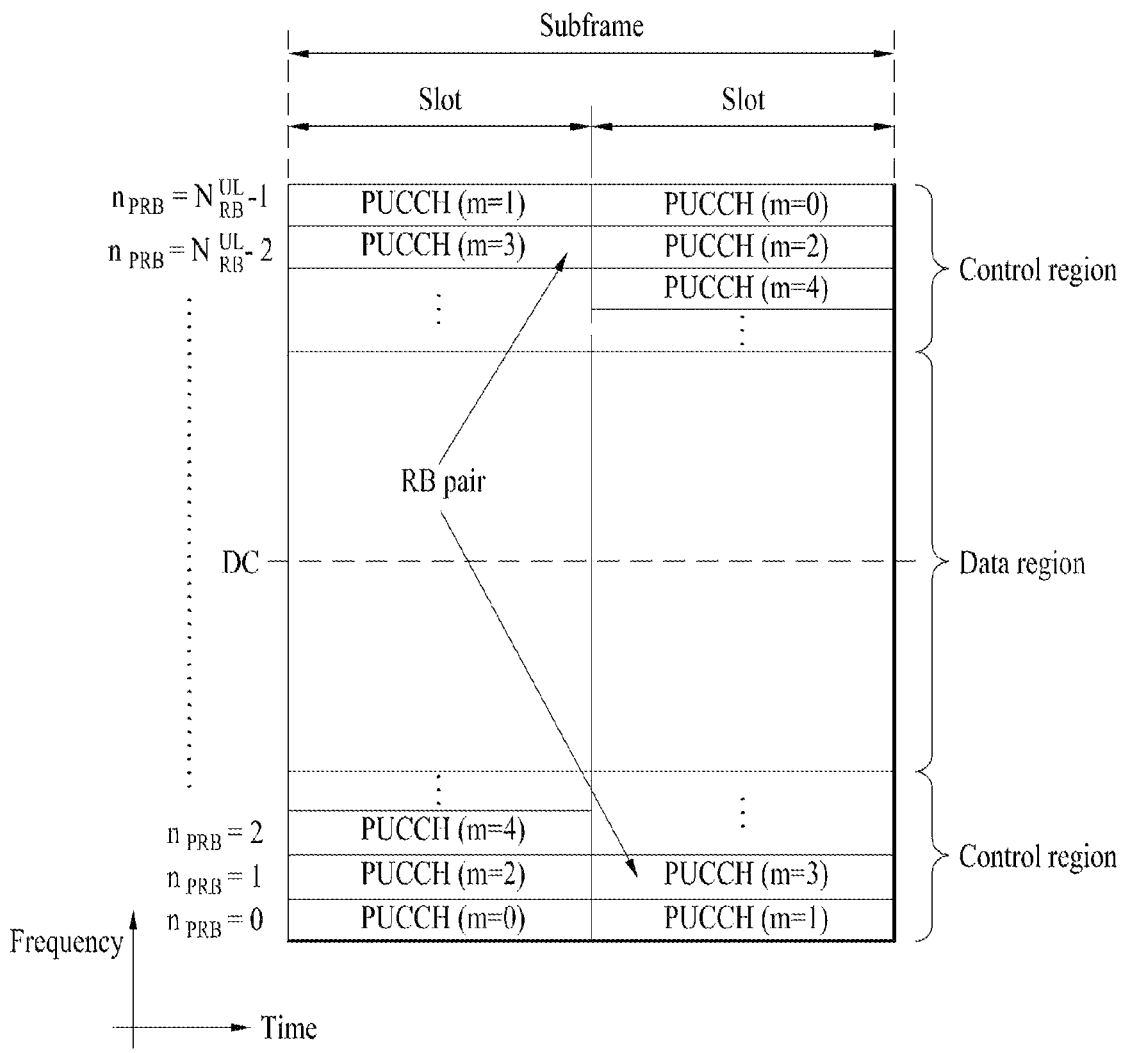
FIG. 6 illustrates the structure of a UL subframe used in a wireless communication system.

FIG. 6 illustrates the structure of a UL subframe used in a wireless communication system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword)

on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

HARQ is a method used for error control. HARQ-ACK transmitted in DL is used for error control regarding UL data and HARQ-ACK transmitted in UL is used for error control regarding DL data. In DL, an eNB schedules one or more RBs for a UE selected according to a predetermined scheduling rule and transmits data to the UE using the scheduled RBs. Hereinafter, scheduling information for DL transmission will be referred to as a DL grant and a PDCCH carrying the DL grant will be referred to as a DL grant PDCCH. In UL, the eNB schedules one or more RBs for a UE selected according to a predetermined scheduling rule and the UE transmits data using allocated resources in UL. A transmitting device performing a HARQ operation waits for an ACK signal after transmitting data (e.g. transport blocks or codewords). A receiving device performing the HARQ operation transmits an ACK signal only when the data has been correctly received and transmits a NACK signal when there is an error in the received data. Upon receiving the ACK signal, the transmitting device transmits next (new) data but, upon receiving the NACK signal, the transmitting device retransmits data. In a HARQ scheme, error data is stored in a HARQ buffer and initial data is combined with retransmission data in order to raise reception success rate.

The HARQ scheme is categorized as synchronous HARQ and asynchronous HARQ according to retransmission timing and as channel-adaptive HARQ and channel-non-adaptive HARQ depending upon whether channel state is considered during determination of the amount of retransmission resources.

In the synchronous HARQ scheme, when initial transmission fails, retransmission is performed at a timing determined by a system. For example, if it is assumed that retransmission is performed in every X-th (e.g. X=4) time unit (e.g. a TTI or subframe) after initial transmission fails, an eNB and a UE do not need to exchange information about retransmission timing. Therefore, upon receiving a NACK message, the transmitting device may retransmit corresponding data in every fourth time unit until an ACK message is received. In contrast, in the asynchronous HARQ scheme, retransmission timing is determined by new scheduling or additional signaling. That is, the retransmission timing for error data may be changed by various factors such as channel state.

In the channel-non-adaptive HARQ scheme, a modulation and coding scheme (MCS), the number of RBs, etc., which are needed for retransmission, are determined as those during initial transmission. In contrast, in the channel-adaptive HARQ scheme, the MCS, the number of RBs, etc. for retransmission are changed according to channel state. For example, in the channel-non-adaptive HARQ scheme, when initial transmission is performed using 6 RBs, retransmission is also performed using 6 RBs. In contrast, in the channel-adaptive HARQ scheme, even when initial transmission is performed using 6 RBs, retransmission may be performed using RBs less or greater in number than 6 according to channel state.

Based on such classification, a combination of the four HARQ schemes may be considered, but an asynchronous/channel-adaptive HARQ scheme and a synchronous/channel-non-adaptive HARQ scheme are mainly used. In the asynchronous/channel-adaptive HARQ scheme, the retransmission timing and the amount of retransmitted resources are adaptively changed according to channel state so as to maximize retransmission efficiency. However, since overhead is increased, this scheme is generally not considered in UL. Meanwhile, in the synchronous/channel-non-adaptive HAQR scheme, since the retransmission timing and retransmission resource allocation are determined by the system, almost no overhead occurs but retransmission efficiency is very low if this scheme is used in an environment in which the channel state is considerably changed. In current communication system, the asynchronous HARQ scheme is used in DL and the synchronous HARQ scheme is used in UL.

Meanwhile, a time delay occurs until an eNB receives ACK/NACK from a UE and transmits retransmission data after transmitting scheduling information and data according to the scheduling information. The time delay is generated due to a channel propagation delay or a time consumed for data decoding/encoding. Accordingly, if new data is transmitted after a HARQ process which is currently in progress is ended, a gap is created due to a time delay. In order to prevent a gap in data transmission from being created during a time delay duration, a plurality of independent HARQ processes is used. For example, when an interval between initial transmission and retransmission is 7 subframes, 7 independent HARQ processes may be performed to transmit data without a gap. A plurality of parallel HARQ processes enables successive UL/DL transmission while the eNB awaits HARQ feedback for previous UL/DL transmission. Each HARQ process is associated with a HARQ buffer of a medium access control (MAC) layer. Each HARQ process manages state parameters regarding the number of transmissions of a protocol data unit (PDU) in the buffer, HARQ feedback for a MAC PDU in the buffer, a current redundancy version, etc.

The present invention proposes a method for feeding back a result of a HARQ operation to an eNB or a transmitting device and performing an operation according to feedback, when the UE performs a HARQ operation. Upon receiving a data signal using a specific time/frequency resource, the UE checks whether the data signal has been correctly received. If the data signal has been correctly received, the UE transmits ACK and, if not, the UE feeds back NACK. For example, the UE may check whether the data signal has been correctly received by decoding the received data signal and performing CRC check for the decoded signal. If it is determined that decoding of the data signal is successful as a result of CRC check, ACK may be fed back and, if it is determined that decoding of the data signal is unsuccessful (i.e. failure), NACK may be fed back, as HARQ-ACK for the data signal. If ACK is reported, the eNB or the transmitting device determines that the data signal has been successfully received by the UE and, if another data signal is present for the UE, the eNB may transmit scheduling information for the other data signal and transmit the other data signal according to the scheduling information. In contrast, if NACK is reported, the eNB or the transmitting device transmits a signal capable of being used to restore corresponding data (hereinafter, restoration signal), so as to cause the UE to restore error data into original data. For example, the transmitting device transmits parity bit(s) for a data signal reported as having an error to the UE which has reported NACK, as the restoration signal. Upon failing to restore the data signal, the UE stores a reception signal in a HARQ buffer and, upon receiving the restoration signal later, the UE may combine the reception signal with the restoration signal. Hereinafter, the restoration signal will be referred to as a retransmission signal or retransmission data and a first transmitted original signal other than a signal transmitted as the restoration signal by the transmitting device will be referred to as an initial signal or initial data.

With introduction of M2M technology, multi-node systems, carrier aggregation, TDD, etc., a method for effectively transmitting a large amount of ACK/NACK information at one time has been demanded. The present invention proposes a method for effectively transmitting UL ACK/NACK information. First, the terms used in association with UL ACK/NACK information transmission of the present invention are summarized below.

HARQ-ACK (Hybrid Automatic Repeat reQuest Acknowledgement): This represents a reception response result to DL transmission (e.g. PDSCH or SPS release PDCCH), i.e. an ACK/NACK/DTX response (simply, ACK/NACK response, ACK/NACK, A/N response, or A/N). The ACK/NACK response refers to ACK, NACK, DTX, or NACK/DTX. HARQ-ACK for a CC or HARQ-ACK of a CC refers to an ACK/NACK response to DL transmission related to the CC (e.g. scheduled for the CC). A PDSCH may be replaced with a transport block or a codeword.

PDSCH: This corresponds to a DL grant PDCCH. The PDSCH is used interchangeably with a PDSCH with a PDCCH in this specification.

SPS release PDCCH: This refers to a PDCCH indicating SPS release. A UE feeds back ACK/NACK information about the SPS release PDCCH on UL.

SPS PDSCH: This refers to a PDSCH transmitted on DL using resources configured semi-statically by SPS. The SPS PDSCH has no DL grant PDCCH corresponding thereto. In this specification, the SPS PDSCH is used interchangeably with a PDSCH without a PDCCH.

PUCCH index: This corresponds to a PUCCH resource. A PUCCH index indicates, for example, a PUCCH resource index. The PUCCH resource index is mapped to at least one of an orthogonal cover (OC), a cyclic shift (CS), and a PRB.

ARI (ACK/NACK Resource Indicator): This is used to indicate a PUCCH resource. For example, the ARI may be used to indicate a resource change value (e.g. offset) for a specific PUCCH resource (group) (configured by a higher layer). As another example, the ARI may be used to indicate a specific PUCCH resource (group) index in a PUCCH resource (group) set (configured by a higher layer). The ARI may be included in a TPC field of a PDCCH corresponding to a PDSCH on an SCC. PUCCH power control is performed through a TPC field in a PDCCH that schedules a PCC (i.e. PDCCH corresponding to a PDSCH on a PCC). The ARI may be included in a TPC field of a PDCCH other than a PDCCH that has a downlink assignment index (DAI) initial value and schedules a specific cell (e.g. PCell). The ARI is used interchangeably with a HARQ-ACK resource indication value.

DAI (Downlink Assignment Index): This is included in DCI transmitted over a PDCCH. The DAI may indicate an order value or a counter value of a PDCCH. For convenience, a value indicated by a DAI field of a DL grant PDCCH is referred to as a DL DAI and a value indicated by a DAI field of a UL grant PDCCH is referred to as a UL DAI.

Implicit PUCCH resource: This represents a PUCCH resource/index linked to the lowest CCE index of a PDCCH that schedules a PCC or is transmitted on the PCC.

Explicit PUCCH resource: This may be indicated using an ARI.

PDCCH that schedules a CC: This indicates a PDCCH that schedules a PDSCH or a PUSCH on the CC. That is, the PDCCH that schedules a CC refers to a PDCCH corresponding to a PDSCH or a PUSCH on the CC.

PCC (Primary Component Carrier) PDCCH: This represents a PDCCH that schedules a PCC. That is, the PCC PDCCH represents a PDCCH corresponding to a PDSCH or a PUSCH on the PCC. The PCC PDCCH is transmitted only on the PCC on the assumption that cross-CC scheduling is not performed for the PCC.

SCC (Secondary Component Carrier) PDCCH: This represents a PDCCH that schedules an SCC. That is, the SCC PDCCH represents a PDCCH corresponding to a PDSCH or a PUSCH on the SCC. When cross-CC scheduling is permitted for the SCC, the SCC PDCCH may be transmitted on a CC other than the SCC (e.g. on a PCC or another SCC). When cross-CC scheduling is not permitted for the SCC, the SCC PDCCH is transmitted only on the SCC.

Cross-CC scheduling: This refers to an operation of transmitting a PDCCH that schedules an SCC on a CC other than the SCC (e.g. on a PCC or another SCC). When only two CCs of a PCC and an SCC are present, cross-CC scheduling refers to an operation of scheduling/transmitting all PDCCHs only on one PCC.

Non-cross-CC scheduling: This represents an operation of scheduling/transmitting a PDCCH that schedules each CC on the CC.

In the present invention, a CC that carries a PDCCH is referred to as a scheduling CC, and a CC that carries a PDSCH/PUSCH scheduled by the PDCCH is referred to as a scheduled CC.

UCI carried by one PUCCH may differ in size and usage according to a PUCCH format and differ in size according to a code rate. The following table shows a mapping relationship between a PUCCH format and UCI.

TABLE 7

| PUCCH format | Uplink Control Information (UCI) |
| --- | --- |
| Format 1 | Scheduling Request (unmodulated waveform) |
| Format 1a | 1-bit HARQ ACK/NACK with/without SR |
| Format 1b | 2-bit HARQ ACK/NACK with/without SR |
| Format 2 | CSI (20 coded bits) |
| Format 2 | CSI and 1- or 2-bit HARQ ACK/NACK (20 bits) for extended CP only |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 bits) |

Referring to Table 7, PUCCH format series 1 is mainly used to transmit ACK/NACK information, PUCCH format series 2 is mainly used to transmit channel state information (CSI) such as CQI/PMI/RI, and PUCCH format series 3 is mainly used to transmit ACK/NACK information.

Figure 7:
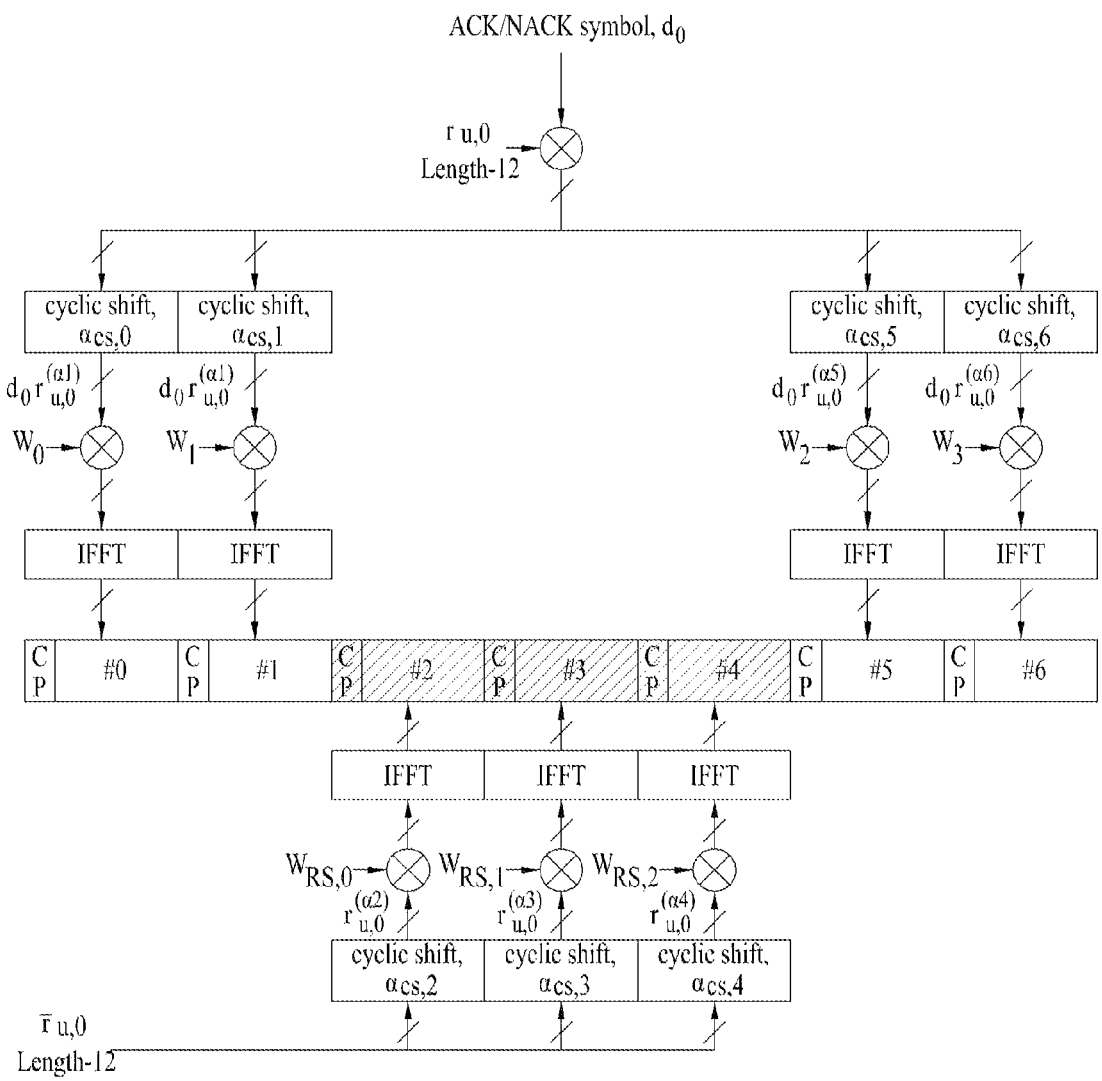
FIG. 7 illustrates a slot level structure of PUCCH format 1a/1b.

FIG. 7 illustrates a slot level structure of PUCCH format 1a/1b.

PUCCH format 1a/1b is used for ACK/NACK transmission. In a normal CP, SC-FDMA symbol #2/#3/#4 is used for demodulation reference signal (DM RS) transmission. In an extended CP, SC-FDMA symbol #2/#3 is used for DM RS transmission. Therefore, 4 SC-FDMA symbols in a slot are used for ACK/NACK transmission. For convenience, PUCCH format 1a/1b is referred to as PUCCH format 1.

Referring to FIG. 7, 1-bit [b(0)] and 2-bit [b(0)b(1)] ACK/NACK information are modulated by a binary phase shift keying (BPSK) modulation scheme and a quadrature phase shift keying (QPSK) modulation scheme, respectively and are generated as one ACK/NACK modulation symbol $d_0$. Each bit [b(i), i=0,1] of the ACK/NACK information represents a HARQ response to a corresponding DL transport block. Each bit [b(i), i=0,1] of the ACK/NACK information is 1 for positive ACK and 0 for a negative ACK (NACK). Table 8 shows a modulation table defined for PUCCH formats 1a and 1b in legacy LTE.

TABLE 8

| PUCCH format | b(Q), . . . , b($M_{bit}$ − 1) | d(0) |
| --- | --- | --- |
| 1a | 0 | 1 |
|    | 1 | −1 |
| 1b | 00 | 1 |
|    | 01 | −j |
|    | 10 | j |
|    | 11 | −1 |

PUCCH format 1a/1b performs cyclic shift ($\alpha_{cs,x}$) in the frequency domain and performs spreading using an orthogonal spreading code (e.g. Walsh-Hadamard or DFT code) ($w_0, w_1, w_2, w_3$) in the time domain. Since code multiplexing is performed in both the frequency domain and the time domain, more UEs can be multiplexed in the same PUCCH RB.

The ACK/NACK modulation symbol $d_0$, i.e. the complex-valued symbol d(0) is multiplied with a cyclically shifted length $N^{PUCCH}_{seq}=12$ sequence $r_{u,v}^{(\alpha_p)}(n)$ for each of the P antenna ports used for PUCCH transmission according to the following equation.

$$y^{(\tilde{p})}(n) = \frac{1}{\sqrt{P}} d(0) \cdot r_{u,v}^{(\alpha_{\tilde{p}})}(n), n = 0, 1, \ldots, N^{PUCCH}_{seq} - 1 \quad [\text{Equation 3}]$$

In Equation 3, $r_{u,v}^{(\alpha_p)}(n)$ is defined by a cyclic shift a of a base sequence $r_{u,v}^{(\alpha_p)}(n)$ according to the following equation.

$$r_{u,v}^{(\alpha_p)}(n) = e^{j\alpha n} \bar{r}_{u,v}(n), 0 \leq n \leq M_{sc}^{RS} \quad [\text{Equation 4}]$$

For PUCCH format 1a/1b, $M_{sc}^{RS} = N_{seq}^{PUCCH}$. Base sequences $\bar{r}_{u,v}(n)$ are divided into groups, where $u \in \{0,1,\ldots,29\}$ is the group number and v is the base sequence number within the group, such that each group contains one base sequence (v=0) of each length $M_{sc}^{RS} = mN_{sc}^{RB}$ $1 \leq m \leq 5$ and two base sequences (v=0,1) of each length $M_{sc}^{RS} = mN_{sc}^{RB}$, $6 \leq m \leq N_{RB}^{max,UL}$. For PUCCH format with $M_{sc}^{RS} = 1 \cdot N_{sc}^{RB}$, base sequence is given by the following equation.

$$\bar{r}_{u,v}(n) = e^{j\varphi(n)\pi/4}, 0 \leq n \leq M_{sc}^{RS} - 1 \quad [\text{Equation 5}]$$

In Equation 5, $\varphi(n)$ for $M_{sc}^{RS} = 1 \cdot N_{sc}^{RB}$ is given by the following table.

TABLE 9

| u | φ(0), . . . , φ(11) |
| --- | --- |
| 0 | −1 1 3 −3 3 3 1 1 3 1 −3 3 |
| 1 | 1 1 3 3 3 −1 1 −3 −3 1 −3 3 |
| 2 | 1 1 −3 −3 −3 −1 −3 −3 1 −3 1 −1 |
| 3 | −1 1 1 1 1 −1 −3 −3 1 −3 3 −1 |
| 4 | −1 3 1 −1 1 −1 −3 −1 1 −1 1 3 |
| 5 | 1 −3 3 −1 −1 1 1 −1 −1 −1 3 −3 1 |
| 6 | −1 3 −3 −3 −3 3 1 −1 3 3 −3 1 |
| 7 | −3 −1 −1 −1 1 −3 3 −1 1 −3 3 1 |
| 8 | 1 −3 3 1 −1 −1 −1 1 1 3 −1 1 |
| 9 | 1 −3 −1 3 3 −1 −3 1 1 1 1 |
| 10 | −1 3 −1 1 1 −3 −3 −1 −3 −3 3 −1 |
| 11 | 3 1 −1 −1 3 3 −3 1 3 1 3 3 |
| 12 | 1 −3 1 1 −3 1 1 1 −3 −3 −3 1 |
| 13 | 3 3 −3 3 −3 1 1 3 −1 −3 3 3 |
| 14 | −3 1 −1 −3 −1 3 1 3 3 3 −1 1 |
| 15 | 3 −1 1 −3 −1 −1 1 1 3 1 −1 −3 |
| 16 | 1 3 1 −1 1 3 3 3 −1 −1 3 −1 |
| 17 | −3 1 1 3 −3 3 −3 −3 3 1 3 −1 |
| 18 | −3 3 1 1 −3 1 −3 −3 −1 −1 1 −3 |
| 19 | −1 3 1 3 1 −1 −1 3 −3 −1 −3 −1 |
| 20 | −1 −3 1 1 1 1 3 1 −1 1 −3 −1 |
| 21 | −1 3 −1 1 −3 −3 −3 −3 −3 1 −1 −3 |
| 22 | 1 1 −3 −3 −3 −3 −1 3 −3 1 −3 3 |
| 23 | 1 1 −1 −3 −1 −3 1 −1 1 3 −1 1 |
| 24 | 1 1 3 1 3 3 −1 1 −1 −3 −3 1 |
| 25 | 1 −3 3 3 1 3 3 1 −3 −1 −1 3 |
| 26 | 1 3 −3 −3 3 −3 1 −1 −1 3 −1 −3 |
| 27 | −3 −1 −3 −1 −3 3 1 −1 1 3 −3 −3 |
| 28 | −1 3 −3 3 −1 3 3 −3 3 3 −1 −1 |
| 29 | 3 −3 −3 −1 −1 −3 −1 3 −3 3 1 −1 |

The sequence-group number u in slot $n_s$ is defined by a group hopping pattern $f_{gh}(n_s)$ and a sequence-shift pattern $f_{ss}$ according to the following equation.

$$u = (f_{gh}(n_s) + f_{ss}) \bmod 30 \quad [\text{Equation 6}]$$

There are 17 different hopping patterns and 30 different sequence-shift patterns. Sequence-group hopping can be enabled or disabled by a specific parameter provided by the higher layer. The group-hopping pattern $f_{gh}(n_s)$ for PUCCH is given by the following equation.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad [\text{Equation 7}]$$

where the pseudo-random sequence c(i) may be defined by the following equation.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 8]}$$

In Equation 8, $N_C=1600$ and the first m-sequence is initialized with $x_1(0)=1$, $x_1(n)=0$, $n=1,2,\ldots,30$. The initialization of the second m-sequence is denoted by $c_{init}=\Sigma_{i=0}^{30} x_2(i) \cdot 2^i$ with a value depending on the application of the sequence.

In Equation 7, the pseudo-random sequence generator is initialized with $$c_{init} = \left\lfloor \frac{N_{ID}^{cell}}{30} \right\rfloor$$

at the beginning of each radio frame. The sequence-shift pattern $f_{ss}$ for PUCCH, $f_{ss}^{PUCCH}$ is given by $f_{ss}^{PUCCH}=N_{ID}^{cell} \bmod 30$.

Figure 8:
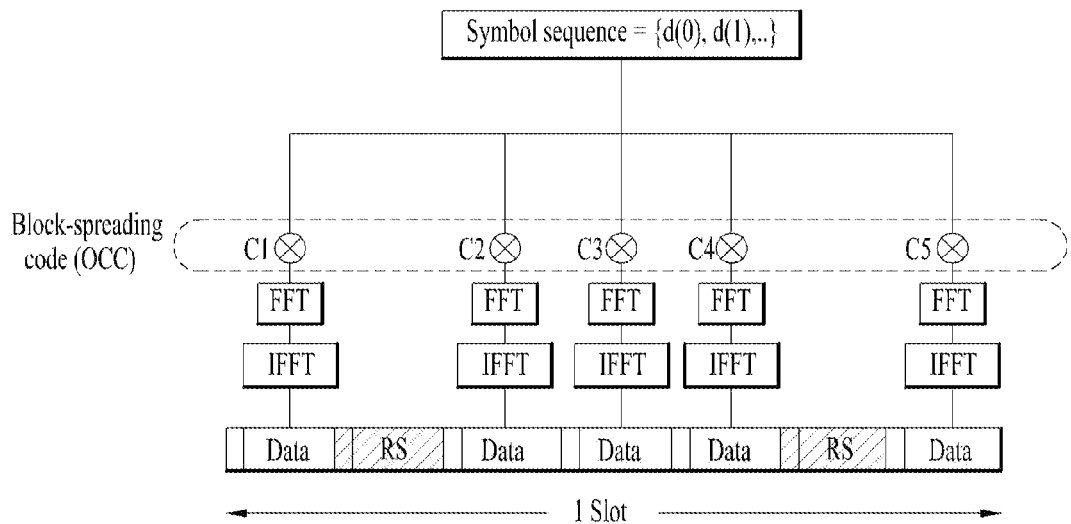
FIG. 8 illustrates a PUCCH format based on block spreading.

FIG. 8 illustrates a PUCCH format based on block spreading.

A block spreading scheme is to transmit a symbol sequence after spreading the symbol sequence in the time domain by an orthogonal cover code (OCC) (also called an orthogonal sequence). According to the block spreading scheme, control signals of multiple UEs may be multiplexed in the same RB by the OCC and then transmitted to an eNB. In PUCCH format 2, one symbol sequence is transmitted in the time domain, wherein UCI of the UEs is multiplexed using a cyclic shift of a CAZAC sequence (i.e. CCS) and then transmitted to the eNB. On the other hand, in a block spreading based new PUCCH format (hereinafter, PUCCH format 3), one symbol sequence is transmitted in the frequency domain, wherein the UCI of the UEs is multiplexed using OCC based time-domain spreading and then transmitted to the eNB. Referring to FIG. 8 as an example, one symbol sequence is spread by a length-5 (i.e. SF=5) OCC and then mapped to 5 SC-FDMA symbols. Although a total of 2 RS symbols is used during one slot in FIG. 8, 3 RS symbols may be used and an OCC of SF=4 may be used for spreading of the symbol sequence and multiplexing of the UEs. Here, the RS symbols may be generated from a CAZAC sequence having a specific cyclic shift and may be transmitted in a form of applying (multiplying) a specific OCC to a plurality of RS symbols in the time domain. In FIG. 8, fast Fourier transform (FFT) may be applied in advance before the OCC and discrete Fourier transform (DFT) may be applied instead of FFT.

For convenience of description, such a channel coding based scheme for transmitting a plurality of ACK/NACK signals using PUCCH format 2 or PUCCH format 3 is referred to as a "multi-bit ACK/NACK coding" transmission method. This method indicates a method for transmitting an ACK/NACK coded block generated by channel-coding ACK/NACK information or DTX information (indicating that a PDCCH has not been received/detected) for PDSCH(s) of multiple DL CCs, i.e. PDSCH(s) transmitted on multiple DL CCs. For example, if the UE receives two codewords (CWs) by operating in a single user MIMO (SU-MIMO) mode on any DL CC, the UE may transmit one of a total of 4 feedback states of ACK/ACK, ACK/NACK, NACK/ACK, and NACK/NACK per CW on the DL CC or one of a maximum of 5 feedback states including DTX. If the UE receives a single CW, there may be a maximum of 3 states of ACK, NACK, and DTX (if NACK and DTX are identically processed, there may be a total of two states of ACK and NACK/DTX). Accordingly, if a maximum of 5 DL CCs are aggregated for the UE and the UE operates in an SU-MIMO mode on all CCs, there may be a maximum of $5^5$ transmittable feedback states and the size of an ACK/NACK payload for representing these states is a total of 12 bits. If DTX and NACK are identically processed, the number of feedback states is $4^5$ and the size of the ACK/NACK payload for representing these states is a total of 10 bits.

Physical resources used for PUCCHs depend on two parameters, $N^{(2)}_{RB}$ and $N^{(1)}_{cs}$, given by higher layers. The parameter $N^{(2)}_{RB}$, $N^{(2)}_{RB}$ which is equal to or greater than 0 ($N^{(2)}_{RB} \geq 0$), indicates available bandwidth for PUCCH format 2/2a/2b transmission at each slot and is expressed as an integer multiple of $N^{RB}_{sc}$. The parameter $N^{(1)}_{cs}$ $N_{CS}^{(1)}$ indicates the number of cyclic shifts used for PUCCH format 1/1a/1b in an RB used for a mixture of format 1/1a/1b and format 2/2a/2b. A value of $N^{(1)}_{CS}$ $N_{CS}^{(1)}$ is an integer multiple of $\Delta^{PUCCH}_{shift}$ within a range of $\{0, 1, \ldots, 7\}$. $\Delta^{PUCCH}_{shift}$ provided by higher layers. If $N^{(1)}_{CS}$ $N_{CS}^{(1)}$ is 0, no mixed RBs are present. At each slot, at most one RB supports a mixture of PUCCH format 1/1a/1b and PUCCH format 2/2a/2b. Resources used for transmission of PUCCH format 1/1a/1b, PUCCH format 2/2a/2b, and PUCCH format 3 by antenna port p are expressed by $n^{(1,\tilde{p})}_{PUCCH}$, $n^{(2,\tilde{p})}_{PUCCH} < N^{(2)}_{RB} N^{RB}_{sc}$+ceil$(N^{(1)}_{cs}/8) \cdot (N^{RB}_{sc} - N^{(1)}_{cs}-2)$ and $n^{(3,\tilde{p})}_{PUCCH}$ $n_{PUCCH}^{(1,\tilde{p})}$, respectively, which are indexes of non-negative integer indexes.

A UE is assigned a PUCCH resource for UCI transmission by an eNB through an explicit scheme using a higher-layer signal or through an implicit scheme using a dynamic control signal.

More specifically, an orthogonal sequence and/or a cyclic shift to be applied to UCI are determined from PUCCH resource indexes according to a specific rule predefined for each PUCCH format, and resource indexes of two RBs in a subframe, to which a PUCCH is to be mapped, are provided. For example, a PRB for PUCCH transmission in a slot $n_s$ is given as follows.

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases} \quad \text{[Equation 9]}$$

In Equation 9, the variable m depends on the PUCCH format. PUCCH format 1/1a/1b, PUCCH format 2/2a/2b, and PUCCH format 3 are given by Equation 10, Equation 11, and Equation 12, respectively.

$$m = \quad \text{[Equation 10]}$$

$$\begin{cases} N_{RB}^{(2)} & \text{if } n_{PUCCH}^{(1,\tilde{p})} < c \cdot \frac{N_{cs}^{(1)}}{\Delta_{shift}^{PUCCH}} \\ \left\lfloor \frac{n_{PUCCH}^{(1,\tilde{p})} - c \cdot \frac{N_{cs}^{(1)}}{\Delta_{shift}^{PUCCH}}}{c \cdot \frac{N_{sc}^{RB}}{\Delta_{shift}^{PUCCH}}} \right\rfloor + N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

In Equation 10, denotes a PUCCH resource index of an antenna port p for PUCCH format 1/1a/1b. For ACK/NACK PUCCH, $n_{PUCCH}^{(1,\tilde{p})}$ is a value implicitly determined by the first CCE index of a PDCCH carrying scheduling information of a corresponding PDSCH.

$$m = \lfloor n_{PUCCH}^{(2,\tilde{p})} / N_{sc}^{RB} \rfloor \qquad \text{[Equation 11]}$$

where $n_{PUCCH}^{(2,\tilde{p})}$ denotes a PUCCH resource index of an antenna port p for PUCCH format 2/2a/2b and is a value transmitted to a UE from an eNB through higher-layer signaling.

$$m = \lfloor n_{PUCCH}^{(3,\tilde{p})} / N_{SF,0}^{PUCCH} \rfloor \qquad \text{[Equation 12]}$$

$n_{PUCCH}^{(3,\tilde{p})}$ denotes a PUCCH resource index of an antenna port $\tilde{p}$ for PUCCH format 3 and is a value transmitted to a UE from an eNB through higher-layer signaling. $N^{PUCCH}_{SF,0}$ indicates a spreading factor for the first slot of a subframe. For all of two slots of a subframe using normal PUCCH format 3, $N^{PUCCH}_{SF,0} n_{SF,0}^{PUCCH}$ is 5. For first and second slots of a subframe using a reduced PUCCH format 3, $N^{PUCCH}_{SF,0} n_{SF,0}^{PUCCH}$ is 5 and 4, respectively.

Figure 9:
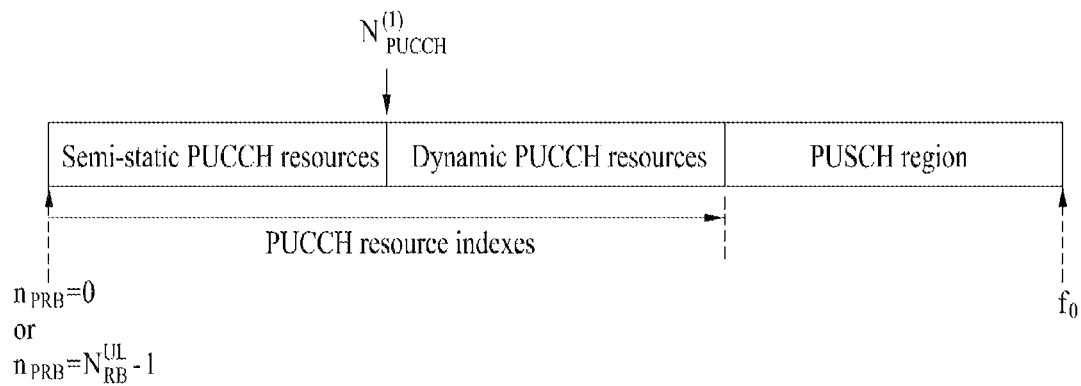
FIG. 9 illustrates logical arrangement of physical uplink control channel (PUCCH) resources used in one cell.

FIG. 9 illustrates logical arrangement of PUCCH resources used in one cell.

PUCCH resources configured on one CC include PUCCH resources for transmission of CSI, PUCCH resources for transmission of SPS ACK/NACK and SR, and PUCCH resources for transmission of dynamic ACK/NACK (i.e. PUCCH resources dynamically allocated in linkage with a PDCCH). In a 3GPP LTE/LTE-A system, the PUCCH resources for transmission of CSI, SPS ACK/NACK, SR, etc. are semi-statically reserved by a higher layer signal in an explicit manner. Hereinafter, the PUCCH resources dynamically determined in linkage with the PDCCH for transmission of ACK/NACK will be especially referred to as dynamic PUCCH resources or implicit PUCCH resources, and PUCCH resources explicitly configured by a higher layer signal will be especially referred to as semi-static PUCCH resources or explicit PUCCH resources.

Referring to FIG. 9, PUCCH resources for one cell (e.g. $N^{cell}_{ID}$) or one CC are arranged in order of CSI PUCCH resources, SPS ACK/NACK and SR PUCCH resources, and dynamic ACK/NACK PUCCH resources, starting from subcarriers distant from a direct current (DC) subcarrier (i.e. a subcarrier mapped to $f_0$ in a frequency up-conversion process) in the direction of the DC subcarrier. In other words, the PUCCH resources configured semi-statically by higher layer signaling are located at the outer side of UL transmission bandwidth and the ACK/NACK PUCCH resources configured dynamically are located nearer a center frequency than the semi-statically configured PUCCH resources. As a PUCCH resource is nearer the center frequency, an index of the PUCCH resource increases. In other words, an index of a PUCCH resource allocated to a PRB near the center frequency is greater than an index of a PUCCH resource allocated to a PRB distant from the center frequency. Multiple PUCCH resources in the same PRB are indexed based on orthogonal sequences and/or cyclic shifts.

In each UE, an ACK/NACK signal is transmitted on different resources including different CSs (frequency domain codes) of a computer-generated constant amplitude zero autocorrelation (CG-CAZAC) sequence and OCs (time domain spread codes). An OC includes, for example, a Walsh/discrete Fourier transform (DFT) OC. An orthogonal sequence (e.g. [$w_0$, $w_1$, $w_2$, $w_3$]) may be applied in either an arbitrary time domain (after fast Fourier transform (FFT) modulation) or an arbitrary frequency domain (before FFT modulation). If the number of CSs is 6 and the number of OCs is 3, a total of 18 UEs may be multiplexed in the same physical resource block based on a single antenna port. In other words, PUCCH resources used for transmission of an ACK/NACK signal may be distinguished by an OCC, a CS (or a CAZAC CS (CCS)), and a PRB. If any one of the OCC, CS, and PRB of PUCCH resources differs, the PUCCH resources may be considered as different resources.

Figure 10:
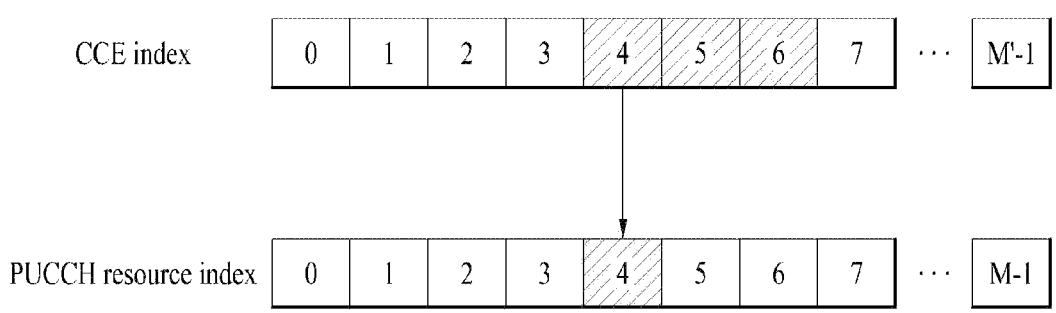
FIG. 10 illustrates an example of determining a dynamic PUCCH resource in a 3GPP LTE/LTE-A system.

FIG. 10 illustrates an example of determining a dynamic PUCCH resource in a 3GPP LTE/LTE-A system.

PUCCH resources for ACK/NACK are not pre-allocated to each UE and a plurality of UEs in a cell dividedly uses a plurality of PUCCH resources at each time point. Specifically, PUCCH resources used by the UE to carry ACK/NACK are dynamically determined based on a PDCCH carrying scheduling information for a PDSCH carrying corresponding DL data or a PDCCH indicating a SPS release. An entire region in which the PDCCH is transmitted in each DL subframe includes a plurality of CCEs and the PDCCH transmitted to the UE is composed of one or more CCEs. For example, if an aggregation level is 2, the PDCCH is composed of two CCEs. The UE transmits ACK/NACK through PUCCH resources linked to a specific CCE (e.g. first CCE) among CCEs constituting a PDCCH received thereby.

Referring to FIG. 10, each square on a DL CC represents a CCE and each square on a UL CC represents a PUCCH resource. A PUCCH index corresponds to a PUCCH resource for ACK/NACK. Assuming that information about a PDSCH is transmitted over a PDCCH consisting of CCE indexes 4 to 6 as illustrated in FIG. 10, the UE transmits ACK/NACK over PUCCH index 4 corresponding to CCE index 4 which is the first CCE constituting the PDCCH. Specifically, a PUCCH resource index for transmission through two antenna ports ($p_0$ and $p_1$) in a 3GPP LTE/LTE-A system, i.e. $n_{PUCCH}^{(1,\tilde{p})}$ of Equation 10, is determined as follows.

$$n_{PUCCH}^{(1,\tilde{p}=0)} = n_{CCE} + N_{PUCCH}^{(1)} \qquad \text{[Equation 13]}$$

$$n_{PUCCH}^{(1,\tilde{p}=0)} = n_{CCE} + 1 + N_{PUCCH}^{(1)} \qquad \text{[Equation 14]}$$

Here, $n_{PUCCH}^{(1,\tilde{p}=0)}$ denotes a PUCCH resource index (i.e. number) to be used by the antenna port $p_0$, $n^{(1,\tilde{p}=1)}_{PUCCH}$ denotes a PUCCH resource index to be used by the antenna port $p_1$, and $N^{(1)}_{PUCCH}$ denotes a value signaled from a higher layer. $N^{(1)}_{PUCCH}$ corresponds to a location at which a dynamic PUCCH resource is started among PUCCH resources of a cell. $n_{CCE}$ corresponds to the smallest value among CCE indexes used for PDCCH transmission. For example, when a CCE aggregation level is 2 or more, the first CCE index among a plurality of CCE indexes aggregated for PDCCH transmission is used to determine an ACK/NACK PUCCH resource. That is, a PUCCH resource used to transmit ACK/NACK for a PDCCH or a PDSCH according to the PDCCH is determined in association with a DL CCE and this is called a dynamic CCE-to-AN linkage.

Meanwhile, a UE conforming to an LTE system cannot simultaneously transmit a PUCCH and a PUSCH. Therefore, when UCI (e.g. CQI/PMI, HARQ-ACK, RI, etc.) needs to be transmitted in a subframe in which a PUSCH is transmitted, the UE multiplexes the UCI in a PUSCH region (PUSCH piggyback). Even in an LTE-A system, the UE may be configured not to simultaneously transmit the PUCCH and the PUSCH. In this case, when transmission of the UCI (e.g. CQI/PMI, HARQ-ACK, RI, etc.) is needed in a subframe in which the PUSCH is transmitted, the UE may multiplex the UCI in a PUSCH region (PUSCH piggybacking).

Figure 11:
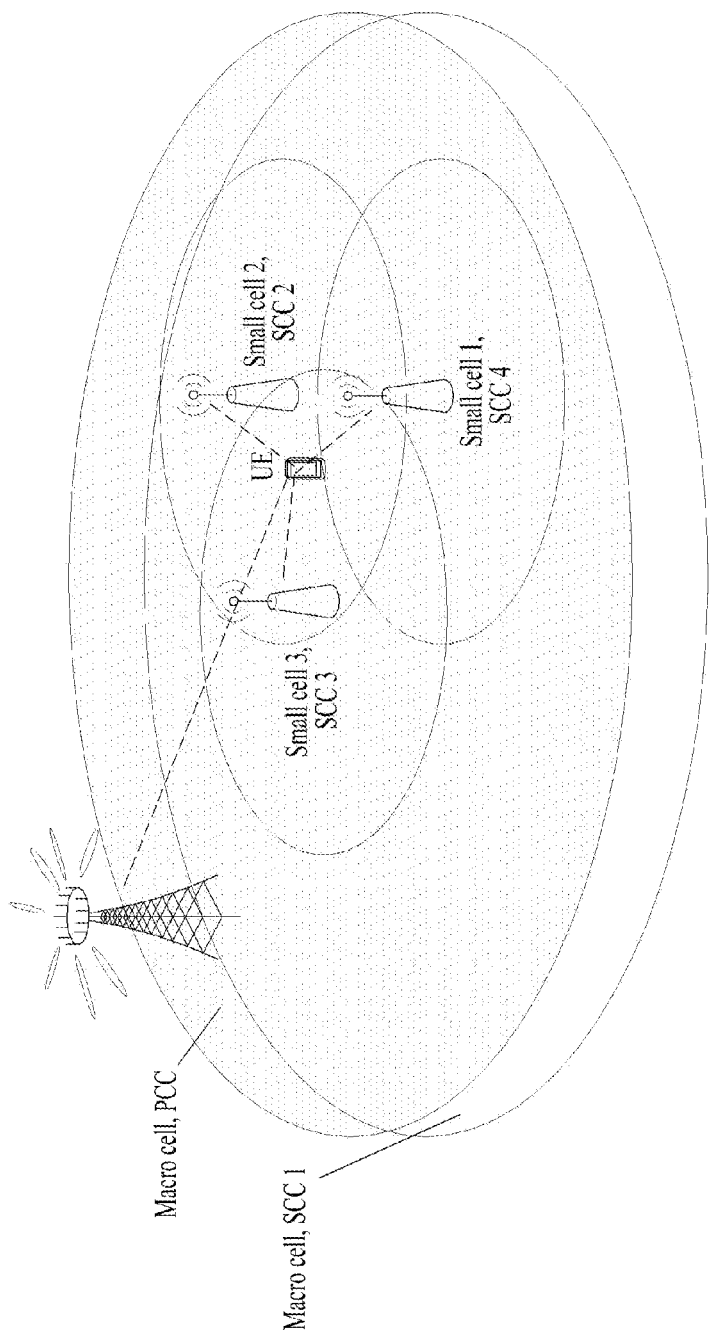
FIG. 11 illustrates inter-site carrier aggregation.

FIG. 11 is a diagram for explaining inter-site CA and intra-site CA.

When a plurality of CCs is aggregated for transmission in a legacy LTE/LTE-A system, if a PCC is present which can perform access to a stand-alone CC and transmission/reception of a control signal and data by enabling data transmission, cell ID acquisition, system information transmission, and physical control signal transmission and an SCC is configured which can perform data transmission/reception only through aggregation with the PCC, it has been assumed that UL/DL frame time synchronization of the SCC is equal to time synchronization of the PCC under the assumption that CCs that are not far away from each other in the frequency domain are aggregated. In addition, in the legacy LTE/LTE-A system, only the case in which aggregated CCs are used by one node and center frequencies of the CCs are adjacent to each other so that frequency characteristics are similar has been considered.

However, the case in which CCs configured for the UE are used by a plurality of nodes separated by a predetermined distance or more rather than by one node may be considered and frequency aggregation between inter-frequencies having different frequency characteristics may also be considered. If different nodes participate in CA using different CCs or the same CC, that is, if different cells participate in CA using the same CC or different CCs, the aggregated CC(s) may be connected by an ideal backhaul or a non-ideal backhaul. The ideal backhaul refers to a backhaul having very high throughput and very low latency, such as dedicated point-to-point connection using an optical fiber, a line-of-sight (LOS) microwave, etc. In contrast, the non-ideal backhaul refers to a typical backhaul widely used in the market, such as an x digital subscriber line (xDSL) or a non-line-of-sight (NLOS) microwave. It may be assumed that the ideal backhaul has no latency in information exchange between cells or nodes. Hereinafter, in the present invention, if CCs connected to each other by the non-ideal backhaul are aggregated, the CCs can be said to be in an inter-site or inter-site CA relationship.

Meanwhile, introducing a small cell, coverage of which is narrower than coverage of an existing cell has been considered. The existing cell, coverage of which is wider than coverage of the small cell is called a macro cell. The small cell provide services in a narrower range than a range in which the existing cell or CC can provide services through power of the corresponding cell, frequency characteristics, etc. Since the small cell using low power can be easily arranged in indoor and outdoor hot spots, the small cell can be usefully used to handle explosive increase of communication traffic. The low power node generally refers to a node having lower transmit power than transmit power of a macro node and a normal eNB. For example, a pico eNB and a femto eNB may be used as low power nodes. In addition, the small cell may be deployed in a currently existing frequency band or a frequency band that is not currently used but will be used in the future.

If ACK/NACK information for data transmitted on a plurality of CCs that are in an inter-site CA relationship is transmitted on a PCC as in a conventional scheme, a node using an SCC cannot receive the ACK/NACK information from the PCC at the right time due to latency existing on a backhaul between the PCC and the SCC and thus a HARQ operation may be correctly performed.

Therefore, the present invention proposes a scheme for transmitting, by a UE, a PUCCH including ACK/NACK information for a plurality of DL data/control channels received on a plurality of CCs in an inter-site CA environment.

In the present invention, an environment in which a plurality of CCs which are in a CA relationship is present is considered. In this case, each of the PCC and the SCC may be a macrocell or a small cell. In other words, in the inter-site CA environment, the PCC may form wide coverage as the macrocell or form narrower coverage than the macrocell as the small cell. Similarly, the SCC may have narrower coverage than the macrocell as the small cell such as SCC2, SCC3, or SCC4 of FIG. 11 or form the macrocell such as SCC1 of FIG. 11.

In FIG. 11, SCC2 to SCC4 that form the small cells may be CCs operating different bands or may be CCs operating in the same band. In other words, SCC2 to SCC4 may operate on inter-frequencies or intra-frequencies. In addition, CCs forming different cells may operate on the same center frequency. When CCs forming different cells operate on the same center frequency, the cells formed by the CCs may be distinguished therebetween by physical cell IDs or virtual cell IDs associated with the CCs. A physical cell ID of a CC may be acquired by a PSS and an SSS on the CC. In the case of a virtual cell ID, if a UE is connected to any one of CCs which are in inter-site CA relationship, virtual cell IDs of cells which have an inter-site CA relationship through the connected CC may be provided to the UE.

If a set of cells/CCs allocated to the UE through RRC signaling is referred to as a configured CC or a configured cell, the present invention divides multiple configured CCs into two groups for convenience and a group to which a PCC belongs and a group consisting of only SCC(s) are respectively referred to as an M-group and an S-group. A PCC and an SCC that belong to the M-group may be located at the same site and a CC which is located at a site different from a site at which the PCC is located may belong to the S-group. In addition, the PCC may always be a macrocell. For example, if the PCC and SCC1, which are macrocells, are located at the same site and SCC2, SCC3, and SCC4, which are small cells, are located at a site different from the site of the PCC as illustrated in FIG. 11, the PCC and SCC1 belong to the M-group and SCC2, SCC3, and SCC4 belong to the S-group. In this case, the CCs of the M-group and the CCs of the S-group may be said to have an inter-site relationship. Since the M-group and the S-group are distinguished from each other based on the site at which the PCC is located, the CCs in the M-group may have an intra-site relationship, whereas the CCs in the S-group may have an inter-sire relationship or may have an intra-site relationship.

In order for a UE to perform an ACK/NACK transmission scheme proposed in the present invention, an eNB informs the UE of information as to whether each SCC has an inter-site CA relationship with a PCC. As an example, the eNB may transmit information indicating whether each SCC belongs to the M-group or the S-group to the UE. When an SCC is configured for the UE, the eNB may inform the UE of information indicating whether the SCC has an inter-site relationship with the PCC, for example, information indicating whether the SCC belongs to the M-group or the S-group, through a higher layer signal (e.g. an RRC signal or a MAC signal).

A. ACK/NACK Transmission Scheme 1

Hereinafter, a scheme in which the UE of the present invention transmits ACK/NACK information for a plurality of carrier-aggregated CCs will be separately described with respect to (1) the case in which only ACK/NACK information for CC(s) in an M-group is transmitted, (2) the case in which only ACK/NACK information for CC(s) in an S-group is transmitted, and (3) the case in which ACK/NACK information for CCs belonging to different groups is simultaneously transmitted.

(1) Case in which Only ACK/NACK Information for CC(s) in an M-Group is Transmitted A method in which the UE of the present invention receives only PDCCH(s) for CC(s) in an M-group and transmits only ACK/NACK information for the CC(s) in the M-group may be as follows.

When the UE receives only PDCCH(s) for scheduling CCs in the M-group and simultaneously transmits ACKs/NACKs for the CCs, the UE may transmit ACKs/NACKs for the CCs in the M-group through a PUCCH resource on a PCC. In other words, the UE may transmit ACK/NACK information for the CCs in the M-group through a UL frequency region f P in which the PCC operates. In this case, the UE may conform to a timing advance (TA) value used/applied in a timing advance group (TAG) to which the PCC belongs upon transmitting the ACK/NACK information. The TAG refers to a group using the same timing reference CC and the same TA value for UL configured CC(s) as a group of serving CC(s) configured by RRC. Time advance maintenance or time alignment maintenance will be described below in brief.

In a 3GPP LTE/LTE-A system based on orthogonal frequency division multiplex (OFDM) technology, time when a signal transmitted by the UE reaches the eNB may vary with the radius of a cell, the location of the UE in the cell, or the mobile velocity of the UE. That is, if the eNB does not manage a transmission timing per UE, a transmission signal of a specific UE may have the possibility of interfering with a transmission signal transmitted by another UE and thus an error rate of a signal received by the eNB increases. In more detail, when the UE attempts to transmit a signal at the edge of a cell, time when the transmitted signal arrives at the eNB will be longer than an arrival time of a signal transmitted by a UE in the center of the cell. Conversely, time when a signal transmitted by the UE in the center of the cell arrives at the eNB will be relatively shorter than time when a signal transmitted by the UE at the edge of the cell arrives at the eNB. In terms of the eNB, since the eNB needs to control data or signals transmitted by all UEs in the cell so as to receive the data or signals within a valid time boundary in order to prevent an interference effect, the eNB should properly adjust a transmission timing of the UE according to a situation of the UE and such adjustment is referred to as time advance maintenance or time alignment maintenance. One method for UL time alignment maintenance is a random access procedure. The eNB receives a random access preamble transmitted by the UE through the random access procedure and calculates a TA value for shortening or delaying the transmission timing of the UE using reception information of the random access preamble. The eNB informs the UE of the calculated TA value through a random access response and the UE updates the transmission timing using the TA value. As another method for UL timing alignment maintenance, a sounding reference signal (SRS) may be used. The eNB receives the SRS periodically or randomly transmitted by the UE, calculates a TA value of the UE through the received signal, and informs the UE of the calculated TA value. Then, the UE updates the transmission timing thereof.

As described previously, the eNB measures the transmission timing of the UE using the random access preamble or the SRS, calculates a timing value to be corrected, and informs the UE of the timing value. A TA value transmitted by the eNB to the UE (i.e. the timing value to be corrected) is referred to as a timing advance command. The timing advance command is processed in a MAC layer. Since the UE is not always present at a fixed location, the transmission timing of the UE is changed every time according to the mobile velocity and location of the UE. In consideration of this fact, upon receiving the timing advance command once from the eNB, the UE assumes that the timing advance command is valid only during a specific time rather than being valid indefinitely. In order to count a specific time during which it is assumed that the timing advance command is valid, the UE uses a time alignment timer. Upon receipt of the timing advance command from the eNB, the UE initiates the timer alignment timer. The UE assumes that the UE aligns UL TA with the eNB, in other words, that a UL time is aligned, only while the time alignment timer is operating. The eNB may notify the UE of a value of the time alignment timer through system information or an RRC signal such as radio bearer reconfiguration.

A UE for which CA is configured may simultaneously transmit and/or receive a signal on one or multiple CCs according to capabilities of the UE. A UE with single TA capability for CA may simultaneously transmit and/or receive a signal on CCs corresponding to serving cells sharing the same TA, i.e., CCs corresponding to cells grouped as one TAG. A UE with multiple TA capability for CA may simultaneously transmit and/or receive a signal on CCs with different TAs, i.e., CCs grouped as multiple TAGs. Serving cells having UL to which the same TA is applied and using the same timing reference cell (or timing reference CC) may be grouped as one TAG. Each TAG includes at least one of serving cells (or serving CCs) with configured UL and mapping of each serving cell (or each serving CC) to the TAG is configured by RRC. A TAG may be classified into a primary TAG including a PCC and a secondary TAG which does not include the PCC.

Meanwhile, when a UE receives only PDCCH(s) for scheduling CCs in the M-group and transmits ACKs/NACKs for the CCs through a PUCCH resource on the PCC, the UE of the present invention may perform power control for ACK/NACK transmission according to UL transmit power used on the PCC. For example, the UE may control transmit power according to a transmit power control (TPC) value for a PUCCH transmitted on the PCC. In addition, the UE may transmit a PUCCH carrying ACK/NACK information for the CCs in the M-group using a cell ID used in the PCC, a cyclic shift, and/or a sequence generated based on an orthogonal cover.

Upon receiving only a PDCCH for scheduling a PCC (i.e. PCC PDCCH) in an FDD environment and transmitting only ACK/NACK for data transmitted on the PCC, the UE may transmit ACK/NACK information through the PUCCH resource on the PCC using PUCCH format 1a or 1b (hereinafter, PUCCH format 1a/1b), and upon receiving a PDCCH for multiple CCs in the M-group and transmitting ACK/NACK information, the UE may transmit the ACK/NACK information through the PUCCH resource on the PCC using PUCCH format 3. Particularly, although a PDCCH for scheduling an SCC in an S-group is transmitted to the UE, if the UE has not received the PDCCH, an eNB or a transmission point for controlling/managing the SCC in the S-group should be aware of the fact that the UE has not received the PDCCH for data transmitted thereby. In other words, when the PCC carries a PDCCH for scheduling data that the SCC belonging to the S-group is to carry, (even when nodes for controlling/managing the PCC and the SCC are different,) a node for controlling/managing the SCC should be aware of whether the PDCCH transmitted through the PCC has successfully arrived at the UE. To this end, even when the UE receives only the PDCCH for scheduling the PCC and transmits only ACK/NACK for the PCC, the UE may transmit ACK/NACK through the PUCCH resource on the PCC using PUCCH format 3.

Upon receiving only PDCCH(s) for CCs in the M-group and transmitting ACK/NACK through a PUCCH format 3 resource on the PCC, the UE may generate a PUCCH carrying ACK/NACK information for all configured CC(s) of the M-group and the S-group and transmit the PUCCH on the PCC. Alternatively, the UE may generate a PUCCH carrying only ACK/NACK information for all configured CC(s) belonging to the M-group and generate the PUCCH on the PCC.

(2) Case in which Only ACK/NACK for CCs in an S-Group is Transmitted

A method in which the UE receives only PDCCH(s) for scheduling CC(s) in an S-group and transmits only ACK/NACK information for the CC(s) in the S-group may be as follows.

1) ACK/NACK Transmission Through a PUCCH Resource of a CC in an S-Group

When the UE receives only PDCCH(s) for CC(s) in the S-group and transmits ACK/NACK information for the CC(s) in the S-group, the present invention proposes transmitting the ACK/NACK information through a PUCCH resource on a specific SCC in the S-group. Hereinafter, the specific CC in the S-group, used by the UE of the present invention to transmit ACK/NACK information for the S-group, will be referred to as an L-SCC. For reference, the present invention may be favorably applied when a backhaul between cells is ideal. In embodiments of the present invention, the L-SCC may be defined as an SCC satisfying a specific rule. For example, an SCC having the smallest SCell index among SCCs of the S-group may be defined as the L-SCC. Alternatively, one SCC among SCC(s) belonging to the S-group may be designated as the L-SCC by an RRC signal, etc. Alternatively, an RRC signal for adding the SCC as a serving CC may include information indicating whether the SCC is the L-SCC. The eNB may inform the UE of whether the SCC is the L-SCC through the RRC signal etc. upon configuring an SCC belonging to the S-group for the UE.

When the S-group includes only one SCC, if the UE receives a PDCCH for scheduling the SCC (i.e. an SCC PDCCH), the UE may transmit ACK/NACK information through a PUCCH resource on the SCC. Meanwhile, upon receipt of only PDCCH(s) for scheduling some or all SCC(s) of the S-group rather than PDCCH(s) for scheduling CC(s) of an M-group, the UE may transmit ACK/NACK information for received data through a PUCCH resource on the L-SCC using PUCCH format 3. In an FDD environment, upon receiving only a PDCCH for scheduling the L-SCC (i.e. an L-SCC PDCCH), the UE may transmit ACK/NACK information for received data on the L-SCC using PUCCH format 1a/1b. In other words, upon receiving only PDCCH(s) for scheduling some or all SCC(s) of the S-group, the UE may transmit ACK/NACK information through a PUCCH resource of a frequency used by the L-SCC.

Upon receiving only PDCCH(s) for scheduling some or all SCC(s) of the S-group, the UE may use a TA value used/applied in a TAG to which the L-SCC belongs in order to transmit ACK/NACK information on the L-SCC. In this case, if the SCC(s) of the S-group are small cell(s), since the radius of each of the small cells is small, the TA value used/applied in the TAG to which the L-SCC belongs may be '0'. That is, when the UE transmits ACK/NACK information for a plurality of small cells belonging to the S-group on the L-SCC in the S-group, the UE may use '0' as the TA value.

Upon receiving only PDCCH(s) for scheduling some or all SCC(s) of the S-group, the UE may perform power control for ACK/NACK transmission according to UL transmit power applied to the L-SCC in order to transmit the ACK/NACK information on the L-SCC. That is, the UE may control ACK/NACK transmit power according to a TPC value for a PUCCH transmitted on the L-SCC. In addition, the UE may transmit a PUCCH carrying ACK/NACK information using a sequence generated based on a cell ID used on the L-SCC, a cyclic shift, and/or an orthogonal cover.

Upon receipt of only PDCCH(s) for CC(s) of the S-group and transmission of ACK/NACK through a PUCCH format 3 resource on the L-SCC, the UE may generate a PUCCH carrying only ACK/NACK information for all configured SCC(s) of the S-group and transmit the PUCCH on the L-SCC. Alternatively, the UE may generate a PUCCH carrying ACK/NACK information for all configured CC(s) of the M-group and the S-group and transmit the PUCCH on the L-SCC. For example, even when the UE receives data for CC(s) belonging to the S-group and transmits only ACK/NACK for the data, the UE may transmit, on the L-SCC, ACK/NACK information generated by configuring ACK(s)/NACK(s) for CC(s) belonging to the M-group as 'DTX'. In this case, the total number of ACK/NACK bits may be maintained at the total number of CCs carrier-aggregated for the UE.

Upon transmitting ACK/NACK information for some or all SCC(s) of the S-group through the PUCCH format 3 resource on the L-SCC, the UE should receive an ACK/NACK resource indicator (ARI) in order to identify the PUCCH format 3 resource to be used. In the present invention, the ARI for the PUCCH format 3 resource to be used on the L-SCC may be provided to the UE according to any one of the following methods.

As the first ARI transmission method according to the present invention, a 'TPC command for PUCCH' field carried by PDCCH(s) for scheduling SCC(s) of the S-group except for the L-SCC may be used to transmit the ARI. That is, the first ARI transmission method of the present invention transmits the ARI on a PDCCH for scheduling the SCC(s) of the S-group except for the L-SCC. In this case, a 'TPC command for PUCCH' field of a PDCCH for scheduling the L-SCC indicates TPC command information when the UE transmits a PUCCH on the L-SCC. Namely, upon receiving one or more PDCCHs for scheduling the SCC(s) of the S-group except for the L-SCC, the UE may identify the ARI information through the 'TPC command for PUCCH' field of the corresponding PDCCH(s). The UE may transmit ACK/NACK information for data received on a plurality of SCCs in the S-group using the identified ARI information through PUCCH format 3 on the L-SCC.

In the second ARI transmission method according to the present invention, the ARI information for using the PUCCH format 3 resource may be indicated to the UE only through a PDCCH for scheduling the L-SCC. Namely, the second ARI transmission method of the present invention transmits an ARI only on the PDCCH for scheduling the L-SCC. To this end, the ARI information may be transmitted to the UE through an ARI field by adding the ARI field to the PDCCH for scheduling the L-SCC or the ARI information may be indicated to the UE by transmitting the ARI information in the 'TPC command for PUCCH' field of the PDCCH. The UE may receive the ARI information from the PDCCH for scheduling the L-SCC, obtain information about a PUCCH resource using the ARI information, and transmit ACK/NACK information through the PUCCH resource of the L-SCC. In this case, cell(s) of the SCC(s) in the S-group except for the L-SCC may obtain ACK/NACK information thereof by blind-decoding the PUCCH format 3 resource of the L-SCC. In other words, a node using an SCC other than the L-SCC among SCCs belonging to the S-group for communication with the UE may acquire ACK/NACK information for data transmitted thereby through the SCC by blind-decoding the PUCCH format 3 resource of the L-SCC.

In order to indicate the PUCCH format 3 resource which is used by the UE to transmit ACK/NACK information on the L-SCC to the UE, the eNB may selectively inform the UE of one of the aforementioned first ARI transmission method and second ARI transmission method. Namely, the ARI transmission method for indicating the PUCCH format 3 resource to be used on the L-SCC in the present invention may be fixed to any of the first ARI transmission method and the second ARI transmission method but the eNB may configure the ARI transmission method through an RRC signal etc.

2) ACK/NACK Transmission Through a PUCCH Resource on a PCC

Upon receiving only PDCCH(s) for CC(s) of an S-group and transmitting ACK/NACK information for the CC(s), the UE may transmit all ACK(s)/NACK(s) for the CC(s) of the S-group through a PUCCH resource on a PCC.

The UE may transmit ACK/NACK information through a UL frequency region fP used by the PCC. Upon transmitting the ACK/NACK information, the UE may transmit the ACK/NACK information according to a TA value used/applied in a TAG to which the PCC belongs. In addition, the UE may perform power control for ACK/NACK transmission according to UL transmit power used in the PCC. That is, the UE may control transmit power of a PUCCH according to a TPC value for the PUCCH transmitted on the PCC. In addition, the UE may transmit the ACK/NACK information or the PUCCH using a cell ID used on the PCC, a cyclic shift, and/or a sequence generated based on an orthogonal cover.

Upon transmitting ACK/NACK information for some or all SCC(s) of the S-group through a PUCCH format 3 resource on the PCC, the UE should receive ARI information in order to identify a PUCCH resource for PUCCH format 3. In the present invention, an ARI for the PUCCH format 3 resource to be used on the L-SCC may be provided to the UE according to any one of the following methods.

In the first ARI transmission method according to the present invention, a 'TPC command for PUCCH' field carried by PDCCH(s) for scheduling SCC(s) of the S-group except for the L-SCC may be used to transmit the ARI. That is, the first ARI transmission method of the present invention transmits the ARI on a PDCCH for scheduling the SCC(s) of the S-group except for the L-SCC. In this case, a 'TPC command for PUCCH' field of a PDCCH for scheduling the L-SCC indicates TPC command information when the UE transmits a PUCCH on the PCC. Namely, upon receiving one or more PDCCHs for scheduling the SCC(s) of the S-group except for the L-SCC, the UE may identify the ARI information through the 'TPC command for PUCCH' field of the corresponding PDCCH(s). The UE may transmit ACK/NACK information for data received on a plurality of SCCs in the S-group using the identified ARI information through PUCCH format 3 on the PCC.

In the second ARI transmission method according to the present invention, the ARI information for using the PUCCH format 3 resource may be indicated to the UE only through a PDCCH for scheduling the L-SCC. Namely, the second ARI transmission method of the present invention transmits an ARI only on the PDCCH for scheduling the L-SCC. To this end, the ARI information may be transmitted to the UE through an ARI field by adding the ARI field to the PDCCH for scheduling the L-SCC or the ARI information may be indicated to the UE by transmitting the ARI information in the 'TPC command for PUCCH' field of the PDCCH for scheduling the L-SCC. The UE may receive the ARI information from the PDCCH for scheduling the L-SCC, obtain information about a PUCCH resource using the ARI information, and transmit ACK/NACK information through the PUCCH resource of the PCC. In this case, cell(s) (or node(s)) of the SCC(s) in the S-group except for the L-SCC may obtain ACK/NACK information thereof by blind-decoding the PUCCH format 3 resource of the PCC.

Alternatively, upon transmitting ACK(s)/NACK(s) for some or all SCC(s) of the S-group through the PUCCH format 3 resource on the PCC, the UE may use a preconfigured or predefined ARI value in order to identify the PUCCH format 3 resource to be used for ACK/NACK transmission.

When the UE receives a PDCCH for a CC of the S-group and transmits ACK/NACK on the PCC, eNB(s) or transmission point(s) for controlling/managing SCC(s) may obtain ACK/NACK information for data transmitted thereby by blind-decoding the PUCCH format 3 resource on the PCC. If the SCCs in the S-group are small cells, according to the proposed scheme, an eNB or a transmission point for controlling/managing the CCs in the S-group may obtain ACK/NACK for data transmitted thereby by overhearing ACK/NACK transmission on the PCC by the UE even though a CC in an M-group and the CC in the S-group are in an inter-site relationship.

(3) Case in which ACK/NACK Information for CC(s) in an M-Group and CC(s) in an S-Group are Simultaneously Transmitted Upon simultaneously receiving PDCCH(s) for CC(s) in the M-group and PDCCH(s) for CC(s) in the S-group, the UE of the present invention may transmit ACK(s)/NACK(s) for the two groups according to any one of the following methods.

1) Transmission of ACK/NACK for an M-group on a PCC and transmission of ACK/NACK for an S-group on an L-SCC If the UE receives PDCCH(s) for CC(s) in the M-group and PDCCH(s) for CC(s) in the S-group and should simultaneously transmit ACK(s)/NACK(s) for the two groups, it is considered that the UE simultaneously transmits ACK/NACK information for the CC(s) in the M-group through a PUCCH resource on a PCC and ACK/NACK information for the CC(s) in the S-group through a PUCCH resource on an L-SCC. Notably, the present invention can operate only when the UE has the capability to simultaneously transmit a PUCCH resource on two CCs.

2) ACK/NACK Transmission on a PCC

When the UE receives PDCCH(s) for CC(s) in an M-group and PDCCH(s) for CC(s) in an S-group, as another method for simultaneously transmitting ACKs/NACKs for the M-group and the S-group, the UE may simultaneously transmit ACK/NACK for a CC in the M-group and ACK/NACK for a CC in the S-group through a PUCCH resource on a PCC.

Upon receiving PDCCH(s) for the CC in the M-group and PDCCH(s) for the CC in the S-group and transmitting ACK/NACK information, the UE may transmit ACKs/NACKs for all CCs in the M-group and the S-group through the PUCCH resource on the PCC. The UE may transmit the ACK/NACK information through a UL frequency region f P used by the PCC. Upon transmitting the ACK/NACK information, the UE may transmit the ACK/NACK information according to a TA value used/applied in a TAG to which the PCC belongs. In addition, the UE may perform power control for ACK/NACK transmission according to UL transmit power applied to the PCC. That is, the UE may control transmit power according to a TPC value for a PUCCH transmitted on the PCC. The UE may transmit the ACK/NACK information or the PUCCH using a cell ID used on the PCC, a cyclic shift, and/or a sequence generated based on an orthogonal cover.

Upon receiving the PDCCH for the CC in the M-group and the PDCCH for the CC in the S-group and transmitting the ACK/NACK information, the UE may transmit the ACK/NACK information through the PUCCH resource on the PCC using a PUCCH format 3 resource. When the UE transmits the ACK/NACK information for the CC in the M-group and the CC in the S-group on the PCC using PUCCH format 3, ARI information for using the PUCCH format 3 resource may be provided to the UE only through a PDCCH for scheduling the PCC. To this end, an eNB or a transmission point for controlling/managing the PCC may inform the UE of ARI information by inserting the ARI information into an ARI field in a manner of adding the ARI field to the PDCCH for scheduling the PCC or by inserting the ARI information into a 'TPC command for PUCCH' field of the PDCCH for scheduling the PCC. The UE may acquire the ARI information from the PCC, acquire information about a PUCCH resource in which a PUCCH is to be transmitted using the ARI information, and transmit the PUCCH through a corresponding PUCCH resource of the PCC. In this case, an eNB or a transmission point for controlling/managing SCCs may obtain ACK/NACK information for data transmitted thereby by blind-decoding the PUCCH format 3 resource of the PCC.

When SCCs in the S-group are small cells, according to the proposed scheme, an eNB or a transmission point for controlling/managing the CCs in the S-group may obtain ACK/NACK for data transmitted thereby by overhearing transmission of ACK/NACK information on the PCC by the UE even though the CC in the M-group and the CC in the S-group have an inter-site relationship.

3) ACK/NACK Transmission on an L-SCC

As another method for simultaneously transmitting ACK/NACK for the CC in the M-group and ACK/NACK for the CC in the S-group, the UE may transmit all ACKs/NACKs for the CCs in the M-group and the S-group on the L-SCC in the S-group.

If the UE should simultaneously transmit ACK/NACK for the CC in the M-group and ACK/NACK for the CC in the S-group, the UE may transmit ACKs/NACKs for all the CCs in the M-group and the S-group through a PUCCH resource on the L-SCC. The UE may transmit ACK/NACK information through a UL frequency region used by the L-SCC. In this case, a TA value applied when the UE transmits ACK/NACK may conform to a TA value used/applied in a TAG to which the L-SCC belongs. The UE may perform power control for ACK/NACK transmission according to UL transmit power used in the L-SCC. That is, the UE may control transmit power according to a TPC value for a PUCCH transmitted on the L-SCC. In addition, the UE may transmit the ACK/NACK information or the PUCCH using a cell ID used on the L-SCC, a cyclic shift, and/or a sequence generated based on an orthogonal cover.

When the UE simultaneously transmits ACK/NACK for the CC in the M-group and ACK/NACK for the CC in the S-group, that is, if a transmission timing of ACK/NACK for the CC in the M-group is identical to a transmission timing of ACK/NACK for the CC in the S-group, the UE may transmit the ACKs/NACKs through a PUCCH resource on the L-SCC using a PUCCH format 3 resource.

If the UE transmits ACK/NACK information for the CC in the M-group and the CC in the S-group on the L-SCC using PUCCH format 3, an ARI indicating the PUCCH resource for PUCCH format 3 may be provided to the UE only through a PDCCH for scheduling the L-SCC. To this end, an eNB or a transmission point may transmit ARI information to the UE by inserting the ARI information into an ARI field in a manner of adding the ARI field to the PDCCH for scheduling the PCC or by inserting the ARI information into a 'TPC command for PUCCH' field of the PDCCH for scheduling the L-SCC. The UE may obtain the ARI information from the PDCCH for scheduling the L-SCC, identify a PUCCH resource to be used to transmit a PUCCH using the ARI information, and transmit the PUCCH through a corresponding PUCCH resource of the L-SCC. In this case, an eNB or a transmission point for controlling/managing CCs other than the L-SCC may obtain ACK/NACK information thereof by blind-decoding a PUCCH format 3 resource of the L-SCC. If SCCs in the S-group are small cells, since the proposed scheme transmits both ACK/NACK for the CC belonging to the M-group and ACK/NACK for the CC belonging to the S-group through the L-SCC which is a small cell, a power saving effect can be obtained in transmitting the ACK/NACK information. Such a scheme can be more effective when most data transmission is performed through the small cell. In this case, an eNB or a transmission point for controlling/managing the CC belonging to the M-group may receive ACK/NACK for data transmitted thereby by receiving the ACK/NACK information from an eNB or a transmission point for controlling/managing the L-SCC through a backhaul.

Upon receiving a PDCCH for the CC in the M-group and a PDCCH for the CC in the S-group, as a method for simultaneously transmitting ACK/NACK for the CC belonging to the M-group and ACK/NACK for the CC belonging to the S-group, the above-described scheme for transmitting the ACKs/NACKs through the PCC and the above-described scheme for transmitting the ACKs/NACKs through the L-SCC may be selectively used. Namely, when the UE receives both the PDCCH for the CC in the M-group and the PDCCH for the CC in the S-group, the eNB may configure whether to transmit ACK/NACK information through a PUCCH resource on the PCC or through a PUCCH resource on the L-SCC through an RRC signal.

Embodiments of the present invention may be applied to the case in which a plurality of PDCCHs for scheduling one CC is present as well as the case in which only one PDCCH for scheduling one CC is present.

For example, upon receiving both PDCCH(s) for scheduling all or some CC(s) in the M-group and PDCCH(s) for scheduling all or some CC(s) in the S-group, the UE may transmit ACK/NACK information for all configured CC(s) of the M-group and the S-group through a PUCCH resource of the PCC. Alternatively, upon receiving both PDCCH(s) for scheduling all or some CC(s) in the M-group and PDCCH(s) for scheduling all or some CC(s) in the S-group, the UE may transmit ACK/NACK information for all configured CC(s) of the M-group and the S-group through a PUCCH resource of the L-SCC. Upon receipt of only PDCCH(s) for scheduling all or some CC(s) in the M-group, the UE may transmit ACK/NACK information for all configured CC(s) of the M-group through the PUCCH resource of the PCC. Meanwhile, upon receiving only PDCCH(s) for scheduling all or some CC(s) in the S-group, the UE may transmit only ACK/NACK information for all configured CC(s) in the S-group through the PUCCH resource of the L-SCC. In other words, upon receiving one or multiple PDCCH(s) for scheduling a CC in the M-group, the UE may transmit ACK/NACK information for all configured CC(s) of the M-group through the PUCCH resource of the PCC. Meanwhile, if the UE receives only one or multiple PDCCH(s) for scheduling a CC in the S-group, the UE may transmit only ACK/NACK information for all configured CC(s) in the S-group (i.e. ACK/NACK information that does not include ACK/NACK information for the M-group) through the PUCCH resource of the L-SCC.

Next, the present invention proposes operation of the UE when PUSCH transmission is configured in a subframe in which the UE transmits ACK/NACK for a CC in the M-group and/or ACK/NACK for a CC in the S-group.

(4) Case in which Only ACK/NACK Information for CC(s) in an M-Group is Transmitted When the UE transmits only ACK/NACK information for CC(s) belonging to the M-group, the UE transmits ACK/NACK information on the PCC as described in (1). If a PUSCH is configured in a subframe in which the UE should transmit the ACK/NACK information, the ACK/NACK information for the CC(s) in the M-group may be transmitted through a PUCCH on the PCC or may be piggybacked on the PUSCH and then transmitted. For example, the UE may transmit the ACK/NACK information on the PUCCH when simultaneous transmission of the PUCCH and the PUSCH is configured and transmit the ACK/NACK information on the PUSCH when simultaneous transmission of the PUCCH and the PUSCH is not configured.

(5) Case in which Only ACK/NACK for CCs in an S-Group is Transmitted

The UE transmits only ACK/NACK information for CC(s) belonging to the S-group and transmits the ACK/NACK information on the L-SCC belonging to the S-group or on the PCC as described above in (2).

If it is predefined that the UE transmits ACK/NACK information for CC(s) belonging to the S-group on the L-SCC or if the UE is configured to transmit the ACK/NACK information on the L-SCC by an RRC signal etc., the UE transmits the ACK/NACK information on the L-SCC. If the ACK/NACK information is transmitted through a PUSCH of the PCC, it is difficult for node(s) of the S-group to identify ACK/NACK information thereof. Accordingly, when a PUSCH is configured to be transmitted using a CC of the M-group in a subframe in which the UE should transmit the ACK/NACK information, the present invention proposes dropping transmission of the PUSCH and transmitting the ACK/NACK information for only CC(s) in the S-group through a PUCCH on the L-SCC. If the PUSCH is configured in the S-group other than the M-group, the UE may transmit the ACK/NACK information on the PUCCH of the L-SCC when simultaneous transmission of the PUCCH and the PUSCH is configured and transmit the ACK/NACK information on the PUSCH when simultaneous transmission of the PUCCH and the PUSCH is not configured.

If it is predefined that the UE transmits ACK/NACK information for CC(s) belonging to the S-group on the PCC or if the UE is configured to transmit the ACK/NACK information on the PCC by an RRC signal etc., the UE transmits the ACK/NACK information on the PCC. In this case, if a PUSCH is configured in a subframe in which the UE should transmit the ACK/NACK information, the ACK/NACK information for CC(s) in the S-group may be transmitted through a PUCCH on the PCC or through the PUSCH configured in the subframe. For example, if a PUSCH of the S-group (i.e. a PUSCH of a CC belonging to the S-group) is configured in a subframe in which the UE is to transmit ACK/NACK information only for the S-group, the UE may transmit the ACK/NACK information on the PUCCH of the PCC when simultaneous transmission of the PUCCH and the PUSCH is configured and transmit the ACK/NACK information on the PUSCH when simultaneous transmission of the PUCCH and the PUSCH is not configured. Unlike this, when the PUSCH is configured on the PCC or a specific SCC in the M-group in a subframe in which the UE transmits the ACK/NACK information for the S-group, the UE may drop the PUSCH and transmit a PUCCH carrying the ACK/NACK information for the S-group on the PCC. This is because if the ACK/NACK information is transmitted through the PUSCH of the PCC, since the node(s) of the S-group are not aware of a PUSCH resource of the PCC and the UE cannot overhear the ACK/NACK information unless a node of the PCC transmits the ACK/NACK information to node(s) of the S-group, it is difficult to identify ACK/NACK information of UE(s).

(6) Case in which ACK/NACK Information for CC(s) in an M-Group and CC(s) in an S-Group is Simultaneously Transmitted If a PUSCH is configured on a random serving CC in a subframe in which the UE transmits ACK/NACK for a CC in the M-group and ACK/NACK for a CC in the S-group, the present invention proposes disabling a scheme for piggybacking ACK/NACK information corresponding to the ACKs/NACKs on the PUSCH and transmitting the ACK/NACK information. This is because, if ACK/NACK information is transmitted through a PUCCH, even a cell that does not use a CC on which the PUCCH is carried and uses other SCCs can overhear the PUCCH and obtain ACK/NACK information thereof but, if ACK/NACK information is transmitted through the PUSCH, a cell using other SCCs does not know a PUSCH resource and may have difficulty in overhearing the PUSCH. In the present invention, a CC for a PUCCH carrying ACK/NACK information (hereinafter, a PUCCH CC) for the M-group and the S-group may be determined according to any one of the above-described methods in (3). For example, unless the UE is configured to simultaneously transmit the PUCCH and the PUSCH, the UE may drop transmission of the PUSCH and transmit the ACK/NACK information using a PUCCH resource of the PUCCH CC. Unlike this, the UE configured to simultaneously transmit the PUCCH and the PUSCH may transmit the PUSCH and the PUCCH in corresponding subframes, respectively.

Alternatively, if the PUSCH is configured in a subframe in which the UE transmits ACK/NACK information for CC(s) belonging to the M-group and CC(s) belonging to the S-group, ACK/NACK information for the CC(s) belonging to the M-group may be piggybacked on the PUSCH on the PCC and transmitted and, if a PUSCH configured on a specific SCC belonging to the S-group is present, ACK/NACK information for SCC(s) in the S-group may be piggybacked on the PUSCH on the specific SCC and transmitted. Alternatively, ACK/NACK information of each SCC (if a PUSCH configured on the SCC is present) may be piggybacked on the PUSCH of the SCC and transmitted. Characteristically, ACK/NACK for a CC on which a PUSCH to be transmitted at an ACK/NACK feedback timing, i.e. a transmission time of ACK/NACK information, is scheduled may be piggybacked on the PUSCH of the corresponding CC and only ACK/NACK information for the other CC(s), i.e. CC(s) on which the PUSCH is not scheduled, may be transmitted through a PUCCH resource on a selected CC according to any one of the methods described in (2).

Alternatively, if the PUSCH is configured in a subframe in which the UE transmits ACK/NACK information for CC(s) belonging to the M-group and CC(s) belonging to the S-group, the UE may drop transmission of the PUSCH and transmit only a PUCCH on a PUCCH CC. Especially, if a PCC is the PUCCH CC and the PUSCH is configured to be transmitted in a subframe corresponding to a PUCCH transmission time on a specific CC belonging to the PCC and/or the M-group (i.e. when PUCCH transmission and PUSCH transmission collide), the UE that cannot perform simultaneous transmission of the PUCCH and the PUSCH may drop the PUSCH and transmit only the PUCCH.

In the present invention, the eNB may inform the UE of which one of a conventional ACK/NACK transmission scheme for transmitting ACK/NACK of all CCs through a PUCCH always on a PCC and a new ACK/NACK transmission scheme proposed in the present invention should be used to transmit ACK/NACK.

B. ACK/NACK Transmission Scheme 2

Figure 12:
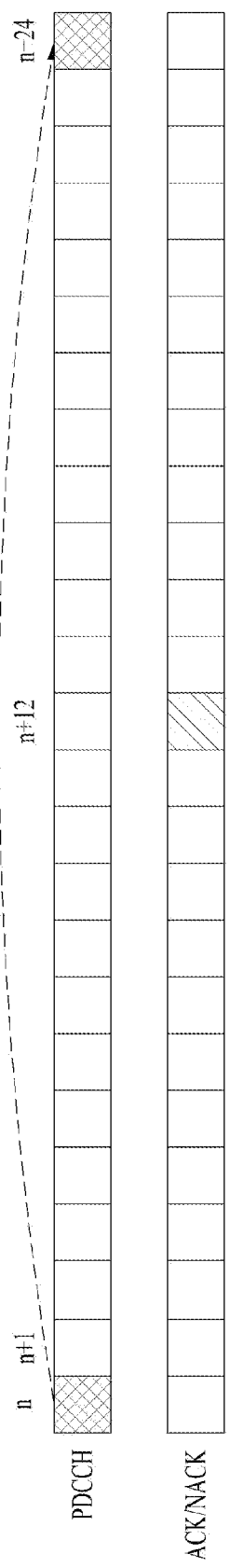
FIGS. 12 and 13 illustrate DL hybrid automatic repeat request (HARQ) processes/timings according to an embodiment of the present invention.
Figure 13:
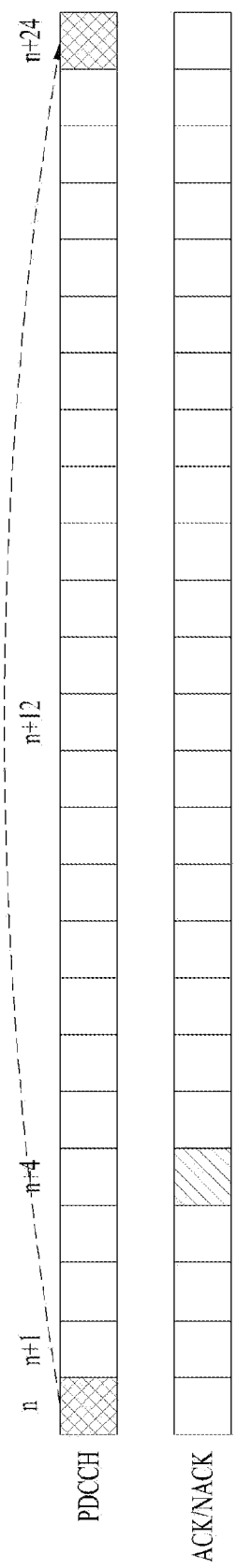

FIGS. 12 and 13 illustrate DL HARQ processes/timings according to an embodiment of the present invention.

When CCs having a CA relationship with each other are divided into the M-group and the S-group as in the above environment, the present invention proposes increasing a HARQ process/timing of CC(s) belonging to the M-group and/or CC(s) belonging to the S-group in order for the UE to transmit ACK/NACK information for a plurality of CCs.

According to an embodiment of the present invention, the number of HARQ processes for all CCs of only the S-group or all CCs of the M-group and the S-group may be increased in order for the UE to transmit ACK/NACK information for a plurality of CCs. For example, according to the present invention, the number of HARQ processes for CCs belonging to only the S-group or CCs belonging to the M-group and the S-group may be increased to 24. In this case, the eNB may transmit a PDSCH to the UE in a maximum of 24 consecutive subframes through CCs for which the number of HARQ processes is increased. In other words, the eNB may transmit a maximum of 24 PDSCHs during 24 subframes. The UE that has received the PDSCH in subframe n may transmit ACK/NACK information, as illustrated in FIG. 12, in subframe n+12 which is later by 12 subframes than subframe n or transmit ACK/NACK information, as illustrated in FIG. 13, in subframe n+4 which is later by 4 subframes than subframe n. For example, in subframe n+k which is a transmission time of ACK/NACK information, k=4 or k=12 may be selectively used or a wireless communication system may be predefined to fixedly use one of k=4 and k=12.

The eNB which has received the ACK/NACK information from the UE may perform, as illustrated in FIGS. 12 and 13, retransmission of the PDSCH in subframe n+24 which is the 24th subframe from subframe n in which the PDSCH has been transmitted.

According to an embodiment of the present invention, in order for the UE to transmit ACK/NACK information for a plurality of CCs, a HARQ timing for all CCs of only the S-group or all CCs of the M-group and the S-group may be increased. For example, in a conventional HARQ process, upon receiving a PDCCH in subframe n, the UE transmits ACK/NACK information in subframe n+4 and, if the ACK/NACK information indicates NACK, the UE receives data retransmission in subframe n+8 or later. In contrast, in a HARQ process according to an embodiment of the present invention, upon receiving the PDCCH in subframe n, the UE transmits ACK/NACK information in subframe n+12 as illustrated in FIG. 12 and, if the ACK/NACK information indicates NACK, the UE may receive data retransmission of an SCC in subframe n+24 or later. Alternatively, for example, the UE which has received the PDCCH in subframe n may transmit ACK/NACK information in subframe n+4 as illustrated in FIG. 13 and, if the ACK/NACK information indicates NACK, an eNB or a transmission point for controlling/managing an SCC may retransmit data in subframe n+24 or later.

In other words, in order to cause a cell corresponding to a CC of the S-group and a cell corresponding to a CC of the M-group, wherein the CCs are in an inter-site relationship with each other, to receive ACK/NACK information for DL data transmitted thereby, the present invention proposes that the eNB receive ACK/NACK information transmitted by the UE and perform retransmission of the PDSCH after k subframes where k is a value (e.g. k=20) larger than a currently used value of '4'. Then, even if there is latency of a backhaul between the M-group and the S-group, data transmission/reception can be smoothly performed because time when the eNB receives ACK/NACK information and performs retransmission or time until the next data is transmitted is increased.

In applying the DL HARQ process/timing according to the present invention, when the UE receives only PDCCH(s) for CC(s) in the M-group or receives PDCCHs for CCs in the M-group and the S-group and transmits ACK/NACK information for the PDCCH(s), the UE may transmit ACK/NACK information through a PCC. When the UE receives only PDCCH(s) for CC(s) belonging to the S-group and transmits ACK/NACK information for the S-group, the UE may transmit the ACK/NACK information through the PCC or transmit the ACK/NACK information on a specific SCC in the S-group. Further, various methods for transmitting ACK/NACK information for the M-group and the S-group described in "A. ACK/NACK transmission scheme 1" may be applied together with the DL HARQ process/timing according to the present invention.

Figure 14:
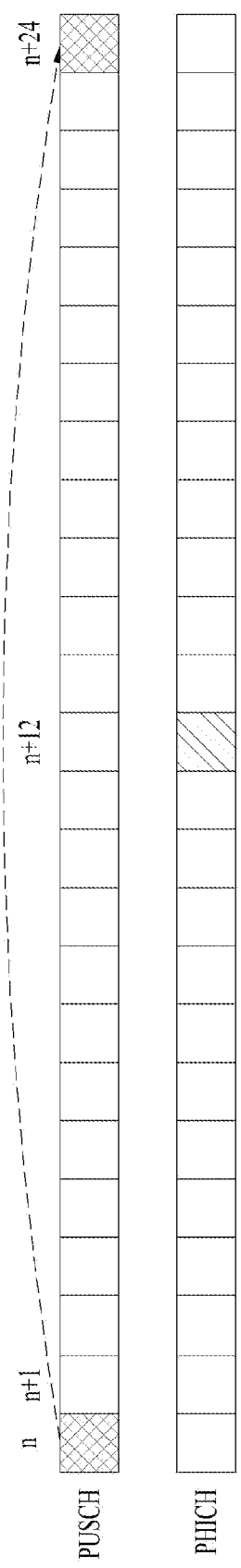
FIGS. 14 and 15 illustrate UL HARQ processes/timings according to an embodiment of the present invention.
Figure 15:
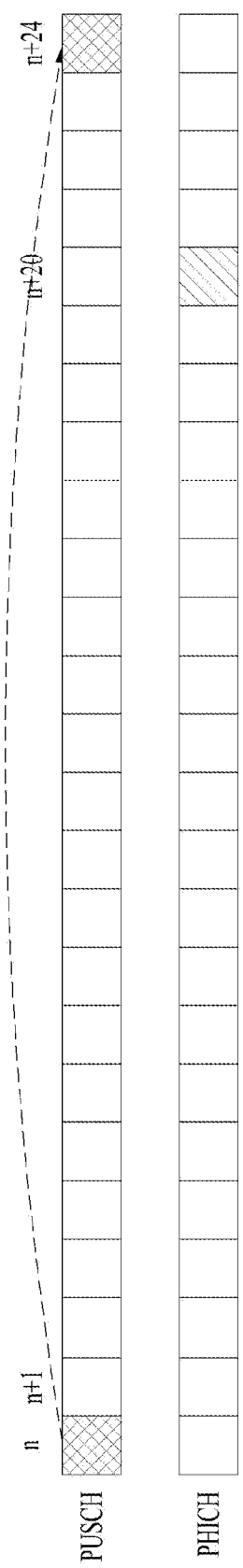
Figure 16:
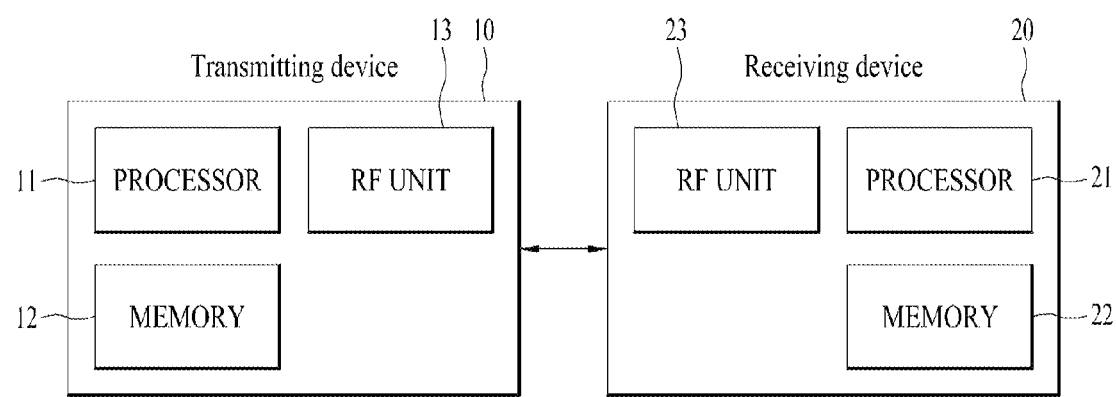
FIG. 16 is a block diagram illustrating elements of a transmitting device 10 and a receiving device 20 for implementing the present invention.

FIGS. 14 and 15 illustrate UL HARQ processes/timings according to an embodiment of the present invention.

In order to receive ACK/NACK for data transmitted by the UE on a plurality of CCs through a PHICH in a UL environment, the number of HARQ processes for all CC(s) of only the S-group or all CC(s) of the M-group and the S-group may be increased. Such a scheme may be applied especially when cross-scheduling is performed on carrier-aggregated CCs.

For example, the number of UL HARQ processes for CCs belonging to only the S-group or the M-group and the S-group may be increased to 24. In this case, the UE may transmit a PUSCH in a maximum of 24 consecutive subframes through CCs for which the number of HARQ processes is increased by the eNB. In other words, the UE may transmit a maximum of 24 PUSCHs during 24 subframes.

The eNB that has received a PUSCH in subframe n may transmit the PHICH, as illustrated in FIG. 14, in subframe n+12 which is later by 12 subframes than subframe n or transmit ACK/NACK information through the PHICH, as illustrated in FIG. 15, in subframe n+20 which is later by 20 subframes than a subframe in which the PUSCH is received. For example, in subframe n+k which is a transmission time of the PHICH by the eNB, k=12 or k=20 may be selectively used or a wireless communication system may be predefined to fixedly use one of k=12 and k=20. In this case, when the eNB performs cross-scheduling for a PCC and an SCC, the eNB may transmit the PHICH on the PCC. The UE which has received the ACK/NACK information through the PHICH may perform, as illustrated in FIGS. 14 and 15, retransmission of the PUSCH in subframe n+24 which is later by 24 subframes than subframe n in which the PUSCH has been transmitted.

In order for the UE to receive ACK/NACK information for data transmitted UE on a plurality of CCs through the PHICH in the UL environment, according to the present invention, a HARQ timing for CCs of only the S-group or the M-group and the S-group may be increased. Such a scheme may be applied especially when cross-scheduling is performed on carrier-aggregated CCs.

For example, a UL HARQ timing for CCs belonging to only the S-group or the M-group and the S-group may be increased to 24 subframes. The eNB that has received the PUSCH in subframe n may transmit the PHICH carrying the ACK/NACK information, as illustrated in FIG. 14, in subframe n+12 which is later by 12 subframes than subframe n or transmit the PHICH carrying the ACK/NACK information, as illustrated in FIG. 15, in subframe n+20 which is later by 20 subframes than subframe n. For example, in subframe n+k which is a transmission time of the PHICH by the eNB, k=12 or k=20 may be selectively used or a wireless communication system may be predefined to fixedly use one of k=12 and k=20. In this case, when the eNB performs cross-scheduling for the PCC and the SCC, the eNB may transmit the PHICH on the PCC. The UE which has received the ACK/NACK information through the PHICH may perform, as illustrated in FIGS. 14 and 15, retransmission of the PUSCH in subframe n+24 which is later by 24 subframes than subframe n in which the PUSCH has been transmitted.

In other words, when a cell corresponding to a CC of the S-group and a cell corresponding to a CC of the M-group, wherein the CCs are in an inter-site relationship with each other, transmit, through the PHICH, ACK/NACK information for UL data received thereby from the UE, the present invention proposes that the cell (or eNB or transmission point) corresponding to the SCC (or PCC) receive the PUSCH transmitted by the UE and transmit the PHICH through the PCC (or SCC) after k subframes where k is a value (e.g. k=20) larger than a currently used value of '4'. Then, even if there is latency of a backhaul between the M-group and the S-group, data transmission/reception can be smoothly performed because time when the cell (or eNB or transmission point) corresponding to the SCC of the M-group receives the PUSCH and transmits the ACK/NACK information to the cell (or eNB or transmission point) of the PCC is increased.

FIG. 17 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

In the present invention, each node or each transmission point includes an eNB RF unit. In the present invention, nodes participating in CA may be managed by one or plural eNB processors. In other words, cells or CCs participating in CA may be managed by the same eNB processor or may be managed by different eNB processors.

The eNB processor and UE processor according to the present invention may determine a CC to be used to receive and transmit ACK/NACK information (hereinafter, a PUCCH CC) according to any one of the above-described embodiments. For example, the eNB processor and UE processor may determine the PUCCH CC according to the embodiment(s) of the present invention described in (1), (2), and (3). The UE processor may control the UE RF unit so as to transmit ACK/NACK information for an M-group and/or an S-group through a PUCCH resource on a PCC and/or an L-SCC according to the embodiment(s) of the present invention described in (1), (2), and (3). The eNB processor may control the eNB RF unit so as to receive the ACK/NACK information for the M-group and/or the S-group through the PUCCH resource on the PCC and/or the L-SCC according to embodiment(s) of the present invention described in (1), (2), and (3).

If there is a PUSCH that is to be transmitted at a PUCCH transmission timing, i.e. in a subframe in which a PUCCH is to be transmitted, the UE processor according to the present invention may control the UE RF unit so as to transmit ACK/NACK information for the M-group and/or the S-group on a PUCCH of a PUCCH CC according to the embodiment(s) of the present invention described in (4), (5), and (6) or transmit the ACK/NACK information on the PUSCH (through piggybacking). If there is a PUSCH to be received at a PUCCH reception timing, i.e. in a subframe in which a PUCCH is to be transmitted, the UE processor according to the present invention may control the UE RF unit so as to receive the ACK/NACK information for the M-group and/or the S-group on the PUCCH of the PUCCH CC or on the PUSCH according to the embodiment(s) of the present invention described in (4), (5), and (6).

In CA of a system, a PCC should be present which can perform access to a stand-alone CC and transmission/reception of a control signal and data by enabling data transmission, cell ID acquisition, system information transmission, and physical control signal transmission and an SCC can be used for data transmission/reception only through aggregation with the PCC. In a legacy system, a scheme in which ACK/NACK information for multiple DL data transmissions on a plurality of CCs is transmitted only through the PCC is used.

As opposed to a conventional scheme in which a PUCCH including ACK/NACK information for a plurality of DL data/control channels transmitted on a plurality of CCs is transmitted only through a PCC, a PUCCH including ACK/NACK information for a plurality of DL transmissions on a plurality of CCs may be transmitted even through an SCC according to the present invention. The present invention can be helpful in terms of UCI offloading for preventing heavy load generated when UCI is transmitted only through the PCC. Especially, the present invention can be more effective when a great number of CCs is aggregated.

In addition, the present invention can effectively transmit ACK/NACK information for CCs that are connected to each other by an ideal or non-ideal backhaul by differently transmitting the ACK/NACK information for CCs according to sites of the CCs.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:
1. A method for transmitting uplink control information by a user equipment, the method comprising:
   receiving, by the user equipment, serving cell configuration information for an addition of one or more secondary cells (SCells);
   configuring a first cell group and a second cell group based on the serving cell configuration information; and
   transmitting acknowledgement (ACK)/negative acknowledgement (NACK) information for the second cell group through a serving cell belonging to the second cell group in an uplink subframe,
   wherein the user equipment is configured with a plurality of serving cells, and the plurality of serving cells includes a primary cell (PCell) and the one or more SCells, wherein the first cell group includes at least the PCell and the second cell group includes at least one SCell, that does not belong to the first cell group, and no PCell, wherein the serving cell configuration information includes group information indicating to which group, between the first cell group and the second cell group, each of the one or more SCells belongs, wherein the serving cell configuration information further includes information indicating a special SCell configured for physical uplink control channel (PUCCH) transmission among SCells belonging to the second cell group, wherein the ACK/NACK information is for the second cell group other than the first cell group, wherein the ACK/NACK information is transmitted through a PUCCH on the special SCell, wherein the ACK/NACK information is transmitted using a first PUCCH format when the ACK/NACK information is for a data channel received only on the special SCell among the SCells belonging to the second cell group, and wherein the ACK/NACK information is transmitted using a second PUCCH format when the ACK/NACK information is for at least one data channel received on an SCell other than the special SCell among the SCells belonging to the second cell group.

2. The method according to claim 1, wherein the ACK/NACK information is transmitted using a PUCCH resource determined based on a transmit power control (TPC) command field carried by a physical downlink control channel (PDCCH) scheduling an SCell other than the special SCell among the SCells belonging to the second cell group.

3. The method according to claim 1, wherein the first cell group and the second cell group are managed by separate base stations.

4. The method according to claim 1, wherein, when there is a physical uplink shared channel (PUSCH) to be transmitted in the uplink subframe, the PUSCH is dropped in the uplink subframe when the PUSCH is configured on the first cell group and the PUSCH is transmitted in the uplink subframe when the PUSCH is configured on the second cell group.

5. A user equipment for transmitting uplink control information, the user equipment comprising:
a radio frequency (RF) unit and a processor that:
controls the RF unit to receive serving cell configuration information for an addition of one or more secondary cells (SCells);
configures a first cell group and a second cell group based on the serving cell configuration information; and
controls the RF unit to transmit acknowledgement (ACK)/negative acknowledgement (NACK) information for the second cell group through a serving cell belonging to the second cell group in an uplink subframe,
wherein the user equipment is configured with a plurality of serving cells, and the plurality of serving cells includes a primary cell (PCell) and the one or more SCells,
wherein the first cell group includes at least the PCell and the second cell group includes at least one SCell, that does not belong to the first cell group, and no PCell,
wherein the serving cell configuration information includes group information indicating to which group, between the first cell group and the second cell group, each of the one or more SCells belongs,
wherein the serving cell configuration information further includes information indicating a special SCell configured for physical uplink control channel (PUCCH) transmission among SCells belonging to the second cell group, wherein, the ACK/NACK information is for the second cell group other than the first cell group, wherein the ACK/NACK information is transmitted through a PUCCH on the special SCell, wherein the ACK/NACK information is transmitted using a first PUCCH format when the ACK/NACK information is for a data channel received only on the special SCell among the SCells belonging to the second cell group, and wherein the ACK/NACK information is transmitted using a second PUCCH format when the ACK/NACK information is for at least one data channel received on an SCell other than the special SCell among the SCells belonging to the second cell group.

6. The user equipment according to claim 5, wherein the ACK/NACK information is transmitted using a PUCCH resource determined based on a transmit power control (TPC) command field carried by a physical downlink control channel (PDCCH) scheduling an SCell other than the special SCell among the SCells belonging to the second cell group.

7. The user equipment according to claim 5, wherein the first cell group and the second cell group are managed by separate base stations.

8. The user equipment according to claim 5, wherein, when there is a physical uplink shared channel (PUSCH) to be transmitted in the uplink subframe, the PUSCH is dropped in the uplink subframe when the PUSCH is configured on the first cell group and the PUSCH is transmitted in the uplink subframe when the PUSCH is configured on the second cell group.

9. A method for receiving uplink control information by a base station, the method comprising:
transmitting serving cell configuration information for an addition of one or more secondary cells (SCells); and
receiving acknowledgement (ACK)/negative acknowledgement (NACK) information for a second cell group through a serving cell belonging to the second cell group in an uplink subframe from a user equipment configured with a first cell group and the second cell group,
wherein the user equipment is configured with a plurality of serving cells, and the plurality of serving cells includes a primary cell (PCell) and the one or more SCells,
wherein the first cell group includes at least the PCell and the second cell group includes at least one SCell, that does not belong to the first cell group, and no PCell,
wherein the serving cell configuration information includes group information indicating to which group, between the first cell group and the second cell group, each of the one or more SCells belongs,
wherein the serving cell configuration information further includes information indicating a special SCell configured for physical uplink control channel (PUCCH) transmission among SCells belonging to the second cell group,
wherein the ACK/NACK information is for the second cell group other than the first cell group,
wherein the ACK/NACK information is received through a PUCCH on the special SCell,
wherein the ACK/NACK information is received using a first PUCCH format when the ACK/NACK information is for a data channel transmitted only on the special SCell among the SCells belonging to the second cell group, and wherein the ACK/NACK information is received using a second PUCCH format when the ACK/NACK information is for at least one data channel received on an SCell other than the special SCell among the SCells belonging to the second cell group.

10. The method according to claim 9, wherein the ACK/NACK information is received using a PUCCH resource determined based on a transmit power control (TPC) command field carried by a physical downlink control channel (PDCCH) scheduling an SCell other than the special SCell among the SCells belonging to the second cell group.

11. The method according to claim 9, wherein the first cell group and the second cell group are managed by separate base stations.

12. The method according to claim 9, wherein, when there is a physical uplink shared channel (PUSCH) to be received in the uplink subframe, reception of the PUSCH is dropped in the uplink subframe when the PUSCH is configured on the first cell group and the PUSCH is received in the uplink subframe when the PUSCH is configured on the second cell group.

13. A base station for receiving uplink control information, the base station comprising:

a radio frequency (RF) unit and a processor that:

controls the RF unit to transmit serving cell configuration information for an addition of one or more secondary cells (SCells); and controls the RF unit to receive acknowledgement (ACK)/negative acknowledgement (NACK) information for a second cell group through a serving cell belonging to the second cell group in an uplink subframe from a user equipment configured with a first cell group and the second cell group, wherein the user equipment is configured with a plurality of serving cells, and the plurality of serving cells includes a primary cell (PCell) and the one or more SCells, wherein the first cell group includes at least the PCell and the second cell group includes at least one SCell, that does not belong to the first cell group, and no PCell, wherein the serving cell configuration information includes group information indicating to which group, between the first cell group and the second cell group, each of the one or more SCells belongs, wherein the serving cell configuration information further includes information indicating a special SCell configured for physical uplink control channel (PUCCH) transmission among SCells belonging to the second cell group, wherein the ACK/NACK information is for the second cell group other than the first cell group, wherein the ACK/NACK information is received on a PUCCH on the special SCell, wherein the ACK/NACK information is received using a first PUCCH format when the ACK/NACK information is for a data channel transmitted only on the special SCell among the SCells belonging to the second cell group, and wherein the ACK/NACK information is received using a second PUCCH format when the ACK/NACK information is for at least one data channel received on an SCell other than the special SCell among the SCells belonging to the second cell group.

14. The base station according to claim 13, wherein the ACK/NACK information is received using a PUCCH resource determined based on a transmit power control (TPC) command field carried by a physical downlink control channel (PDCCH) scheduling an SCell other than the special SCell among the SCells belonging to the second cell group.

15. The base station according to claim 13, wherein the first cell group and the second cell group are managed by separate base stations.

16. The base station according to claim 13, wherein, when there is a physical uplink shared channel (PUSCH) to be received in the uplink subframe, reception of the PUSCH is dropped in the uplink subframe when the PUSCH is configured on the first cell group and the PUSCH is received in the uplink subframe when the PUSCH is configured on the second cell group.

* * * * *